(12) United States Patent
Olsen et al.

(10) Patent No.: US 10,375,003 B1
(45) Date of Patent: Aug. 6, 2019

(54) SYSTEM AND METHOD FOR ESTABLISHING PRICING FOR TELECOM SERVICES

(71) Applicant: Tata Communiactions (America) Inc., Herndon, VA (US)

(72) Inventors: Jason Olsen, Langhorne, PA (US); Edward Hirschman, Princeton, NJ (US); Kaustubh Save, Somerset, NJ (US); Scott Mizerek, Lumberton, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 384 days.

(21) Appl. No.: 15/011,571

(22) Filed: Jan. 31, 2016

Related U.S. Application Data

(63) Continuation of application No. 13/451,156, filed on Apr. 19, 2012, now abandoned.

(60) Provisional application No. 61/477,025, filed on Apr. 19, 2011.

(51) Int. Cl.
| | |
|---|---|
| *H04L 12/58* | (2006.01) |
| *G06Q 10/10* | (2012.01) |
| *G06Q 40/00* | (2012.01) |
| *G06Q 20/10* | (2012.01) |
| *G06Q 40/02* | (2012.01) |

(52) U.S. Cl.
CPC ............. *H04L 51/22* (2013.01); *G06Q 10/10* (2013.01); *G06Q 20/10* (2013.01); *G06Q 40/02* (2013.01); *G06Q 40/10* (2013.01); *G06Q 40/12* (2013.12); *H04L 51/14* (2013.01)

(58) Field of Classification Search
CPC ........ G06Q 40/12; G06Q 40/02; G06Q 40/00; G06Q 10/10; G06Q 50/01; H04L 51/22; H04L 51/14
USPC ........................................................ 705/30
See application file for complete search history.

(56) References Cited

PUBLICATIONS

Paul, Sanjoy Hoboken. Digital Video Distribution in Broadband, Television, Mobile and Converged Networks: Trends, Challenges and Solutions. John Wiley & Sons, Incorporated, Nov 3, 2010. Part One: Technology Trends.*

* cited by examiner

*Primary Examiner* — Nathan C Uber
*Assistant Examiner* — Fawaad Haider
(74) *Attorney, Agent, or Firm* — Kaplan Breyer Schwarz, LLP

(57) ABSTRACT

A system and method for processing new rate sheets in a telecommunications system are disclosed, wherein the method may include receiving an email message from a supplier at a communication network; determining whether the received email message includes rate information; if the received email message includes rate information, fetching details of a template for the supplier associated with the received message; parsing and storing information in a first rate sheet based on information from the template; and updating routing tables based on the parsed rate information.

9 Claims, 18 Drawing Sheets

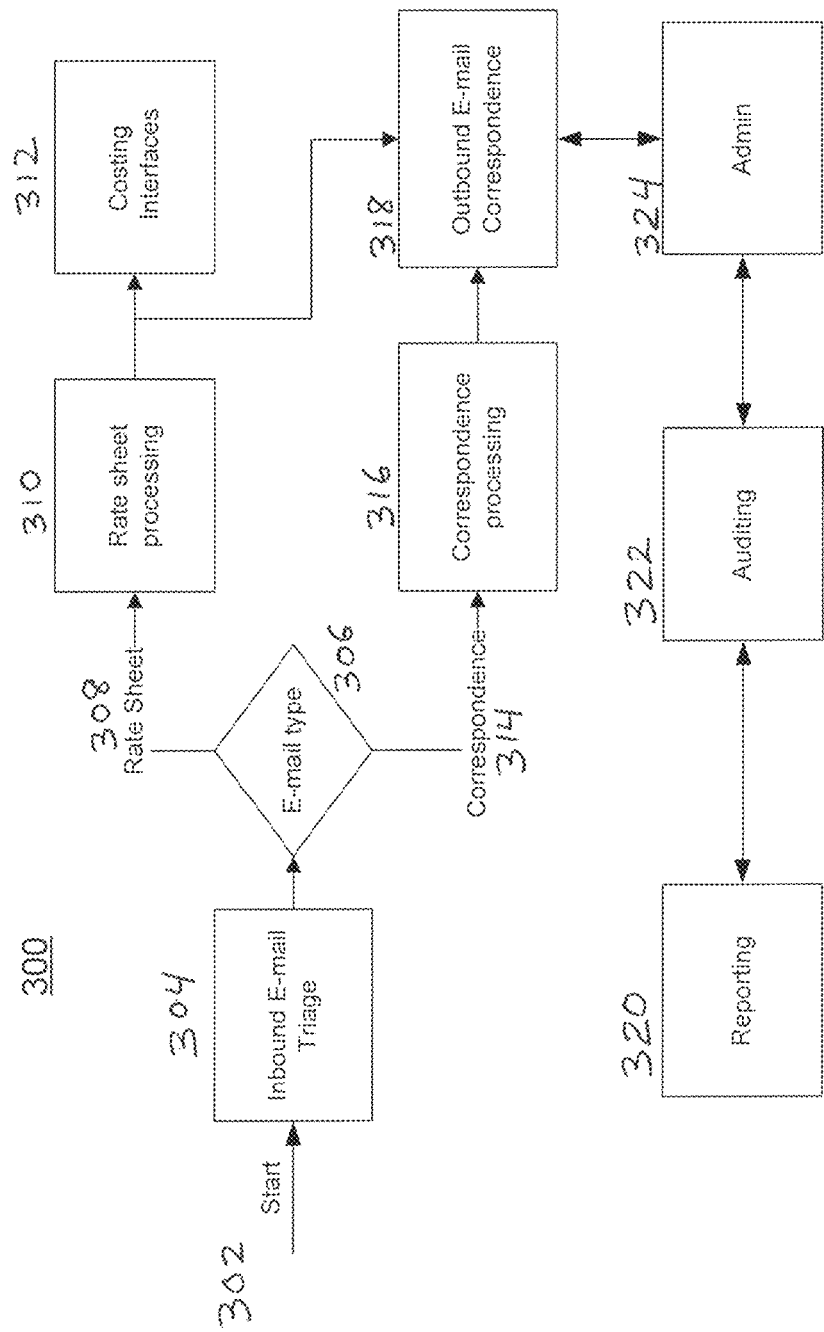

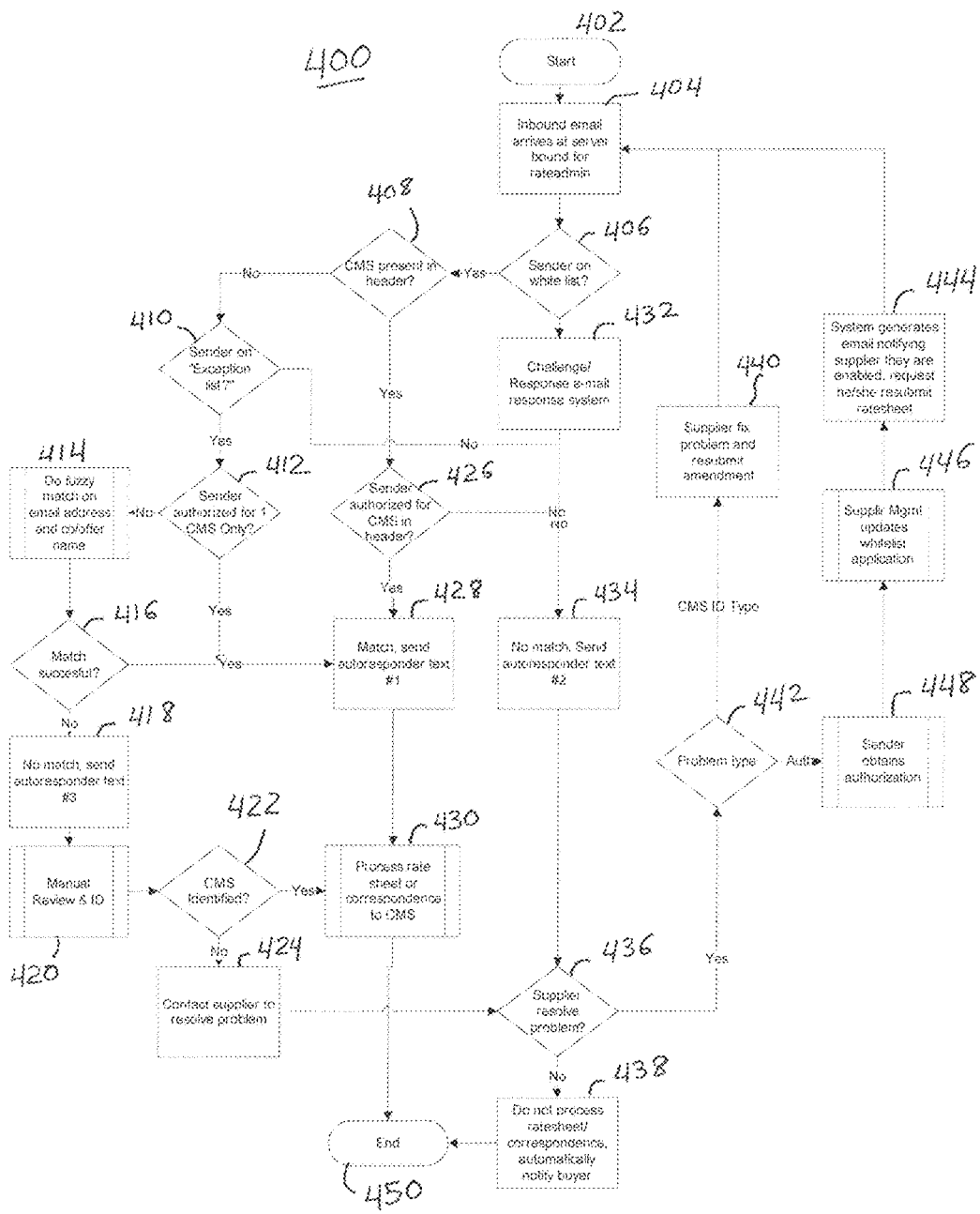

FIG. 12
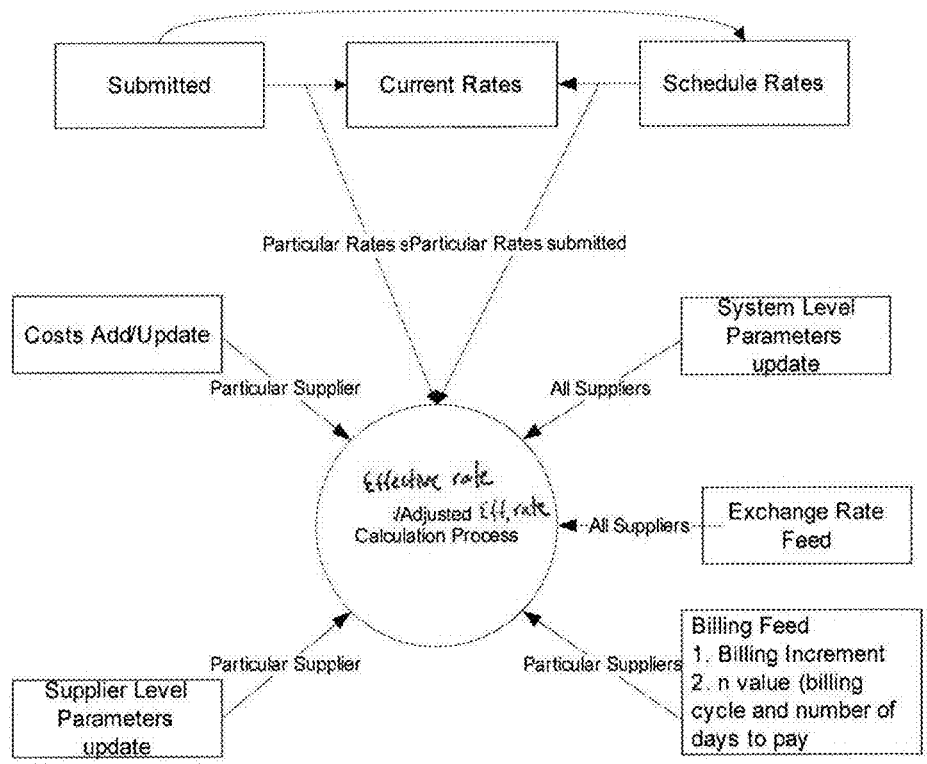
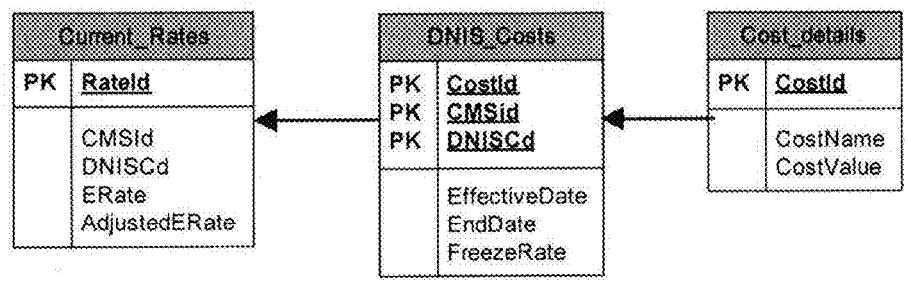

Costing-System Deployment Architecture

1700

SYSTEM AND METHOD FOR ESTABLISHING PRICING FOR TELECOM SERVICES

CROSS-REFERENCE TO RELATED APPLICATIONS

This application is a continuation of U.S. patent application Ser. No. 13/451,156, filed Apr. 19, 2012, which claims the benefit of U.S. Provisional Patent Application Ser. No. 61/477,025, filed Apr. 19, 2011, entitled "System and Method for Establishing Pricing for Telecom Services," the entire disclosures of which application are hereby incorporated by reference herein.

BACKGROUND OF THE INVENTION

In existing systems, telecommunication rates can be set manually after receiving communication from interested parties. For instance, proposed messages that include rates for various services may be exchanged by the interested parties for entry into a telecom system. The messages must be processed manually, and data on various rates may be updated. However, this approach is cumbersome and slow. Accordingly, an improved system and method for processing message that may include rate information is needed.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a flow chart for a method for receiving, processing and/or re-directing email message (i.e. triaging) in accordance with an embodiment of the present invention;

FIG. 4 is a flow diagram of a method for inbound email triage work flow in accordance with an embodiment of the present invention;

FIG. 12 is a block diagram for a method of managing rate information in a data processing center in accordance with an embodiment of the present invention;

DETAILED DESCRIPTION OF THE PREFERRED EMBODIMENTS

Figure 1:
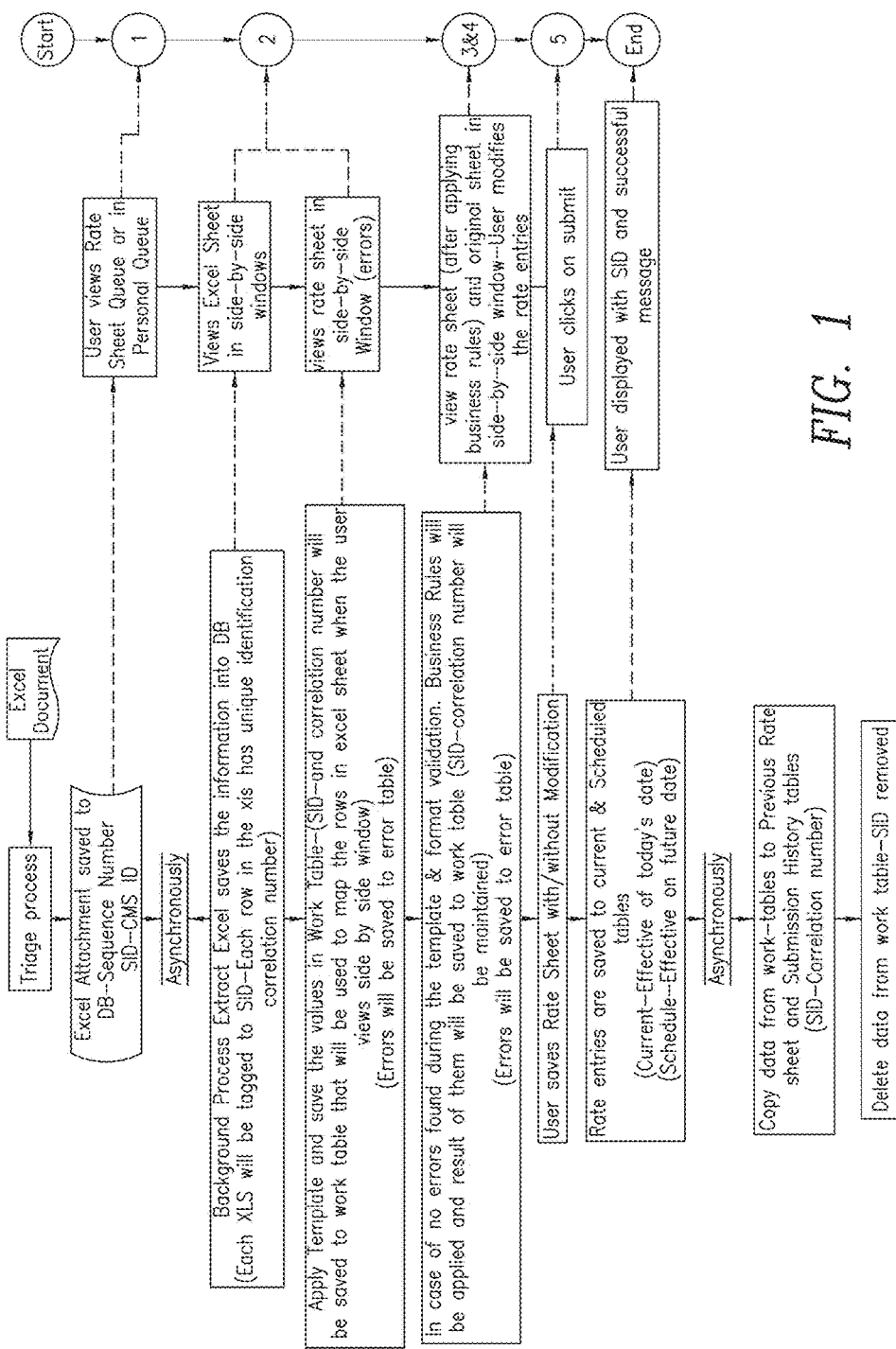
FIG. 1 is a flow diagram for a method for processing telecom rates in accordance with an embodiment of the present invention.

According to one aspect, the disclosed technology is directed to a method that may include receiving an email message at a communication network; determining a processing status of the received message based on at least one of: (a) an originating address of the received message; (b) an originating domain of the received message; and (c) an identity of a sender of the receive message; and directing the received message, within the communication network, as a function of at least one of: (a) the results of the determining step; (b) whether the sender is considered trusted by the communication network; and (c) whether the received message pertains to rates for communication services.

According to another aspect, exemplary embodiments are directed to a method that may include receiving an email from a sender, the sender having an identity, determining whether an attachment is of a specified type, if so, updating rate sheets for a telecommunications system, if not, routing the email to an operator. Preferably, the updating is automatic and in response to the attachment type. Preferably, the method further includes updating routing tables, if the rate sheets are updated, to reflect the rate sheet updates. Preferably, the method further includes determining, from the email, the identity of the sender, and based upon the identity, updating the rate sheets either automatically, semi-automatically, or manually. Preferably, the method further includes maintaining records indicative of whether updating of any rate sheets in response to an email from each of plural senders results in any errors, and based upon the records, altering whether updating is automatic, semi-automatic, or manual.

According to yet another aspect, the disclosure is directed to a method that may include receiving an incoming electronic message, determining if the message relates to rate sheet updates based upon an attachment type, if so, processing the rate sheet to update routing tables, the processing step using one of plural updating methods depending upon an identity associated with a sender of the electronic message, and a stored state associated with the sender. In one embodiment, the stored state associated with a sender is based upon whether a previous rate sheet from said sender is on hold. Preferably, one of plural updating methods depends upon a result of processing of previous rate sheets from said potential sender.

According to yet another aspect, embodiments are directed to receiving an email message at a communication network; determining a processing status of the received message based on at least one of: (a) an originating address of the received message; (b) an originating domain of the received message; and (c) an identity of a sender of the received message; and directing the received message, within the communication network, as a function of at least one of: (a) the results of the determining step; (b) whether the sender is considered trusted by the communication network; and (c) whether the received message pertains to rates for communication services. Preferably, the method further includes further updating routing tables or rate sheets based upon performing the determining and directing steps. Preferably, the method further includes restricting any updates if the sender has prior rate sheets that are not yet processed.

According to yet another aspect, disclosed herein is a method of processing rate sheets sent by a supplier of telecommunications services, the method including updating rates and routing tables within a telecommunications routing service system either automatically, semi-automatically, or manually, based upon a prestored state associated with the supplier, and wherein, based upon subsequent rate sheets received, the state may change from any of manual, automatic, or semiautomatic, to any of manual, automatic, or semi-automatic. Preferably, the method further includes an update queue for queuing rate sheets received from a plurality of suppliers of telecommunications services. Preferably, the queue places rate sheets in the order received. Preferably, the method further includes overriding queue order based upon a Soonest Estimated Effective Date of a rate sheet received from one or more suppliers. Preferably, the method further includes periodically reordering the queue, the periodically reordering step including checking, at prescribed periods, Soonest Estimated Effective Date (SEEDs) associated with each entry in the queue, and reordering the queue in ascending order of SEED. Preferably, the method further includes performing an additional update to the queue upon receipt of a new rate sheet with a SEED earlier than another rate sheet earlier in the queue. Preferably, the update method used for a supplier changes based upon results of a prior update.

According to yet another aspect, a method for determining telecommunications billing rates may include (a) storing information telecommunications rates listed on rate sheets from one or more suppliers in a costing system within a computer system; (b) comparing the rates in the costing system to rates for corresponding services in a billing system; (c) generating a difference report based on corresponding rates in the costing system and the billing system; (d) applying a billing increment factor to rates in the difference report to calculate adjusted effective rates; and (e) sending the adjusted effective rates through a communications network to a routing system.

Preferably, the method further includes performing steps (a) through (e) only for a specified supplier. Preferably, the method further includes performing steps (a) through (e) only for suppliers within a specified country. Preferably, the method further includes performing steps (a) through (e) only for a single, specified rate sheet. Preferably, the method further includes excluding selected rate sheets from having steps (a) through (e) performed thereon if information is missing from the selected rate sheets.

According to yet another aspect, disclosed herein is a method for processing new rate sheets in a telecommunications system, wherein the method may include receiving an email message from a supplier at a communication network; determining whether the received email message includes rate information; if the received email message includes rate information, fetching details of a template for the supplier the message was received from; and completing a first rate sheet based on information from the template. Preferably, the method further includes upon successfully completing the first rate sheet, applying the template details to one or more remaining rate sheets. Preferably, the method further includes assigning selected work sheets to human administrators based on a skill level of each administrator. Preferably, the method further includes assigning numeric skill level values of 1 through 6 to the administrators. Preferably, the skill level value associated with a rate sheet depends on the inclusion of one or more of the following in the rate sheet: (a) advanced costing; (b) bilateral agreements; (c) mobile directs; (d) the number of changes in the rate sheet; (e) the number of deletions in the rate sheet; (f) whether or not there have been rate increases in the rate sheet; and (g) the size of the rate sheet.

According to yet another aspect, the invention is directed to a method for processing rate data for a telecommunications system, wherein the method may include receiving an email message having at least one attachment at a communication network; determining a status for the received message based on at least one of: (a) an originating address of the received message; (b) an originating domain of the received message; and (c) an identity of a sender of the receive message; and initiating manual processing of the received message within the telecommunications system if the message includes two more attachments. Preferably, the method further includes initiating manual processing of the received message within the telecommunications system if the message includes an data having a type included in the group consisting of: (a) an attachment of a document in Microsoft Word; (b) an attachment in PDF format; (c) a rate sheet included within a body of the email message; and (d) a rate sheet forming part of a web page.

According to yet another aspect, the invention is directed to a method for processing telecommunications rate data, wherein the method may include receiving an email message having rate information therein, at a communication network; generating a new rate sheet based on the rate information in the received email message; placing the new rate sheet in a queue of rate sheets; and reordering the rate sheet queue using a Soonest Estimated Effective Date (SEED) algorithm. Preferably, the method further includes overriding the SEED algorithm based ordering of the rate sheet queue using one or more factors selected from the group consisting of: (a) current rank in the queue; (b) Contact Management System (CMS) ID of the entity that sent the email message; (c) the company that sent the email message; (d) the date on which the email message was received; and (e) the number of destinations on the new rate sheet. Preferably, the method further includes automatically reordering the queue about once per hour. Preferably, the method further includes identifying one or more CMS IDs authorized by the sender of the email message if no CMS ID is included in a subject line of the received email. Preferably, the method further includes ordering rate sheets from a particular sender by giving priority to the CMS ID having the shortest notice period, among the one or more CMS IDs for the particular sender.

Other aspects, features, advantages, etc. will become apparent to one skilled in the art when the description of the preferred embodiments of the invention herein is taken in conjunction with the accompanying drawings.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

High Level Design Overview

System Objectives:

The objectives of the system may include one or more the following: processing the rate sheets sent by suppliers with minimum errors; seamlessly exporting the output data to downstream systems like billing and routing; providing tools and utilities to the users (e.g., rate administrators) in a single integrated application, to improve operational efficiently; processing as many rate sheets as possible in a fully automated way, at the same time generating evidence trails and alerts as required; maintaining good page response time even with large number of users; and providing the ability to handle large volumes of data; providing user-friendly graphical user interfaces (GUIs).

Relation to External Environment:

The costing system 200 (FIGS. 2A and 2B) may include the following interfaces to external systems. Costing system may receive inputs from systems such as Order Management Systems (OMS), CMS (Contact Management System), IB (in-bound message handling), Billing, Routing, etc. The data generated by Costing System 200 may be used by downstream operations such as Routing and Billing etc. For example, in one embodiment, a message received by the costing system 200 may include one of more rate sheets sent by a telecommunications supplier of voice termination services. The rate sheet may include costs for terminating (connecting) a call to one or more destinations. The costing system 200 may process the one or more rate sheets and store the identified costs associated with terminating a call to the identified destinations (for the particular supplier). The costing system 200 may transmit the updated costs to a call routing server (e.g., a least cost routing server). Alternatively, the call routing server may request that the costing system 200 provide any new or updated costs associated with terminating a call to various (or all) destinations. The call routing server may update its database with costs associated with terminating a call to various (or all) destinations and determine call routing paths (for call termination) based in part on the updated costs.

Inbound Process:

The Inbound process 202 (FIGS. 2A and 2B) preferably triages incoming emails (also referred to herein as email messages) including the rate sheets received from the suppliers. Herein, the term "triaging" an email message refers to a combination of one or more of receiving an email, assessing the status of the sender of the email message, assessing the status of the content of the email message, assessing the content/attachments of the email message, and/or determining where to direct the received email message within costing system 200 or other portion of the systems disclosed herein. While inbound process 202 is shown outside of the costing system 200 in FIGS. 2A and 2B, in one embodiment, the functions of the inbound (IB) process 202 may be part of or integrated with the costing system 200.

The inbound process 202 preferably reads the emails received at a particular address from a mail server 204 inbox. An email delivery assurance system 206 can send and/or receive delivery confirmations and read receipts of the emails sent/received from costing system 200. Email messages, including delivery receipts, may be processed by the inbound process 202 and saved to the costing database 208 depending upon the category the email message is determined to be in. The IB process 202 may also use "whitelist" information for the different suppliers from costing system 200 and, based on the validity of each sender, can suitably direct the email messages according to the categories each of the messages is in. The costing system 200 may begin processing the rate sheets once the inbound process 200 saves the email in the database 208. It should be appreciated that in one embodiment, the functions of the email server 204 and the email delivery assurance 206 may be part of or integrated with the costing system 200.

Supplier Information:

Information on the various suppliers 207 may be stored in multiple systems. Costing system may communicate with costing interfaces 220, which may include billing system 221, pricing and routing system 223, CMS 224, OMS 225, and data warehouse 226.

The costing system 200 may obtain this information from the Order Management System and validate it with that in CMS 224 before the supplier information is entered, manually or by other means, into costing system 200. Preferably, the rate sheets are uploaded to costing system 200 only after the supplier information is uploaded to costing system 200.

Billing system 221 may also use the rates defined in costing system 200 for generating one or more invoices. The rate entries available in billing system 221 are also provided to costing system 200 for the purpose of comparison of the various rates, and to generate a difference report. Apart from an exchange of rate entries in the costing system 200 and the billing system 221, the costing system 200 may also employ a billing increment factor to calculate the adjusted effective rate. The costing system 200 may use Pricing & Routing destination names for mapping with supplier destinations. The costing system 200 has interface with Pricing and Routing systems to retrieve the latest destination available. Restrictions may also be defined in other systems, such as the pricing and coding tool. These restrictions can also be fed to the costing system 200. These restrictions can be applied before sending the rates to the routing system. In one embodiment, restrictions can be defined in the costing system 200. For example, restrictions can be applied to supplier submissions to remove them as a route choice. Restrictions can be done at the following levels: 1. Supplier; 2. Country; 3. Rate Sheet; 4. Supplier DNIS; and 5. Current Network. Restrictions can be created by Supplier Management or by the Supplier. In one embodiment, Supplier Management restrictions do not affect the supplier rates. Supplier restrictions can have a non-zero or NULL rate.

Rate Sheets that are on Hold Because the Rate Sheets are Missing Information (1) If a Supplier has rate sheets that are in on hold (inquiry state), the rate sheets from the Supplier will automatically be restricted in costing system.

(2) The supplier may be removed from consideration for call routing calculations.

(3) If the Supplier fixes the issues with the rate sheets, then the rate admin may process the rate sheets.

(4) The rate sheet restrictions can be removed.

(5) Supplier rate sheets are allowed to be committed to the costing system DESTINATION/DNIS RESTRICTIONS (1) A request is made to restrict a destination from route. The destination can be at a code level, country level, or network level (for those suppliers offering rates based on current network).
(2) The rate admin will put a start or end date.
(3) The request goes to the supervisor queue from approval.
(4) If the request is approved, the destination will be blocked.
(5) Removal can be done the admin or when the restriction expires.
(6) When the restriction is removed, the supplier will be available as a choice in the costing system for routing purposes.

In one embodiment, the above restrictions can be implemented for all types of rates (flat rates and advanced costing). In another embodiment, the above restrictions can be set hourly.

Outbound Communication:

The outbound communication module can be used for sending email messages to various users such as suppliers and buyers. These messages can be delivered to the users 207 using any suitable mail server such as the email server 204. The failover scenarios can be handled by email server 204, and email delivery assurance 206 can send a confirmation back to Costing system 200 once the message is delivered to suitable external parties. The inbound process 202 can read those receipts and update the costing system 200 database 208. The background process will run in order to go through the receipts, and a "bounce count" will be updated for all the email recipients.

Another background process may be run to identify email recipients having a bounce count that is greater than a "bounce threshold" configured in the system 200 and block any such identified email recipients from receiving/sending the mails from costing system 200. A large number of email messages are sent to suppliers and buyers (policy blasts, promotional mails) etc. which may increase the load on the exchange server. These promotional email transmissions may affect the delivery of more important email messages mails, which need to be delivered to suppliers. Accordingly, the outbound communication module can select the order with which to deliver email messages to email servers based on the priority and importance of the various messages.

Corporate Directory/Authentication Server:

The profiles of various users 207 may be made available on a corporate directory/authentication server (such as authentication server 256). The Costing system 200 may not have any external screen for authenticating the costing system users. Thus, whenever a user is at the costing system URL, the costing system 200 can access the user credentials from HTTP headers and validate the user by using data from the active directory. If the user is successfully authenticated, costing system 200 may determine whether any specific role is assigned to the authenticated user. In this embodiment, by default, the user will have read-only access. The user navigation may be defined based on the roles/groups that user can access. The user profiles can be replicated from authentication server to costing system 200 if the user is assigned a specific role in costing system 200. These user profiles can then be used to create the mailing lists for sending communication to the users. In one embodiment, there need not necessarily be a process for synchronizing the user data in the authentication server to the user data in the costing database 208. However, in alternative embodiments, such synchronization could be practiced.

Communication Portal:

A telecom company employing costing system 200 may expose a few business functions to suppliers through the corporate portal. The creation of users and access to business functions are managed in the portal, and all of these details can be stored in a suitable access/authentication management system. The portal can have its own authentication and authorization mechanism to validate the user credentials and the access level to business functions by each user. The GUI (Graphical User Interface) for these business functions will be deployed along with the portal application but the business functions are exposed as web services, and GUI elements and web services exchanges the information using Simple Object Access Protocol (SOAP) WL.

Alternative/Additional Rate Entry Systems:

In one embodiment, the costing system 200 may interface with alternative/additional rate entry systems. For example, the alternative/additional rate entry system may upload the current stored rates for an India costing system to costing system 200 on a daily basis to merge the India rates with ROW (Rest of the World). In this embodiment, the rate entry system can transmit the files via the File Transfer Protocol (FTP) (or any other suitable transmission protocol) to the Costing system 200 file system (it can be one of the costing database servers), and the background process can load these files into Costing database 208. In case any issues arise while uploading files to the costing system 200 file system, the costing system 200 can use the old entries available in the system. Failover for the file system may not be provided during the FTP process.

Minimize the Content for Each Page Load:

Rate admins may spend a lot of time using the rate sheet processing screens, particularly the screens related to the semi-automatic processing of the rate sheet. Such interfaces may handle a large amount of data. A typical rate sheet may include data related to one thousand destinations and over ten thousand DNIS codes. Different design strategies that may be used to handle these scenarios.

The costing system 200 may use pagination in all the screens which include large volume of data. The costing system 200 may fetch only the data related to the current page from a database and the same can be passed on to the browser for rendering. By using asynchronous data processing, page load happens in multiple small steps based on user interaction instead of one large data load/transfer there by reducing the response time. It may also leverage the server resources while waiting for the user inputs. Wherever work may be done on a large amount of related data, the tab options can be used. Initially, the system can load only the data related to the current tab. When a user clicks on other tabs system will fetch the data from the database in the background using asynchronous processing.

Preprocess the Data

The costing system 200 may process large volumes of data based on user inputs or based on a schedule. To improve the response time or the process completion time (in the case of back-end processing), costing system 200 may preprocess the data at the earliest possible point so that the actual business processing is completed quickly. An example of this approach is used for rate sheet processing.

The rate sheets may be sent by email to the costing system 200, which rate sheets may then be manually processed by rate administrators or automatically processed by the system. Templates may be preconfigured and tested before a supplier's submission mode is set to semi-automatic or automatic mode. So, rather than waiting for the rate admin to process the rate sheets, the system can process the rate sheets in the background, and map the data in the rate sheets to predetermined tables and fields in a database, and save the rate sheets data to the database. In one embodiment, the rate sheets are spreadsheets (such as an Excel spreadsheet) and the data in the spreadsheet cells are mapped to appropriate tables and fields in a database. Once the spreadsheet is mapped, the template will be applied on the mapped data and saved into a 'pre-work' area.

In case of any errors while applying the template, the costing system 200 will load all errors found in the error messages table and stop further processing. Otherwise, the system can go ahead and apply selected business rules and load the information into a work table. If any errors arise while applying the business rules, the observations are stored in to the error table. This will reduce the amount of processing to be done when the rate admin tries to process the rate sheet. The 'pre-work' table and 'work' table would be having same submission identification (SID) and in case of any changes to the template the corresponding entries in the work table for that SID will be removed.

Another example the above scenario is practiced when conducting the effective rateeffective rate calculation. Costing system 200 may calculate effective rateeffective rates and adjusted effective rates based on the supplier rates and also based on the cost involved in terminating the traffic at routing destinations or at the country level. The calculated effective rateeffective rate may be used by downstream systems to find and identify the best rates for the terminating calls at the desired destinations. These effective rates may be calculated by a background process such as the current rates process in Costing System 200. Calculating effective rates every hour (current rate process runs) may increase load on the costing system 200. Thus, to avoid overloading costing system 200, the effective rates may be pre-calculated by the current rates process at night. Whenever a user modifies rates with a new submission, the effective rates for that supplier may be recalculated and saved to the system instantly. Moreover, whenever the currency conversion rates are modified, the effective rates for all the suppliers may be recalculated and saved to the costing system. Access to the effective rates can be provided to the Current Rate Summary process which can be sent to downstream entities without any recalculation. This process may avoid a need to recalculate the effective rates every hour.

Asynchronous Processing
Automated/Semi-Automated Submission Processing:

When triaging an email message, the IB(inbound process) 202 may identify the message as a submission, register an event in a database table that a new submission has been created in the Costing system 200 along with an identification of the submission. A process running on a web server can listen for messages in a message queue registered by the TB process from the database. When instructed to do so, the process may call a data processing component which can read a spreadsheet object from the database, processes the spreadsheet, expands the data in the spreadsheet, and save it into a database table.

On successful completion of this process, the process may register an event in another table saying that the submission is ready for the template validation. An insertion of a record into the event table may trigger a stored procedure in the costing database to apply the template validation for that SID. Upon completing a template validation without any errors, an event may be registered in the table saying that the SID is ready for the business rules validation. This may trigger another stored procedure to apply business rules validation on the SID. Upon successfully completing the business rules validation, the information may be populated into the work area of submission processing. This can result into a better user experience once a new rate sheet starts getting processed in a semi-automated mode since the expansion of spreadsheet, template validation and business rules validation is preferably already completed, and preferably no extra processing is needed, once the user begins interacting with the submission process.

If extensive processing by the system is needed after receiving user inputs, this processing may be performed asynchronously. For example, during the rate sheet processing the user can click on the "submit" button with or without modifying the data. In this case, the data from the work table can be moved to previous submission history and current & scheduled rate tables in the background process. The user doesn't need to wait until all the operations mentioned above process are completed and can go ahead and process the next rate sheet. In case of any failure during these background processes (movement of data from work tables to other tables), an error message may be logged into the separate table and flagged to indicate that submission is pending. The background process will retry the transactions again until it succeeds. Preferably, the data from the work table will not be removed until the rate entries are committed to storage in the "current & schedule rates" tables.

Similarly, notifications (emails or workflow messages) may be delivered to the users asynchronously. For example, if a rate administrator sends the correspondence message to the supplier, he may not have to wait at the page until it is delivered to the user or delivered to the mail server. Instead, the message can be logged to a messages table and a success page may be returned to the rate admin immediately, and the rate admin can continue with the other operations of the costing system. In the background, the notification process will pick up the message based on the priority and deliver it to the respective users through corporate mail server.

Another task is to check for identical rate sheets sent by the supplier successively and deliver a notification to the supplier. However, consider a situation in which the supplier provided duplicate rate sheets to be processed by costing system 200. By keeping the performance in mind while processing the rate sheet, the duplicate check process can be handled though a background process. All the background processes will be configured using the scheduler (such as an Oracle scheduler when the background process can run in database). Since the rate sheets can be processed using an API (such as a Java API), the scheduler may be configured using the scheduler interface. This scheduler can invoke a background thread and may initiate the process to compare the rate sheets received from a supplier with the last rate sheet received by the supplier. In the event that duplicates are discovered, the notification message can be dropped into the message table which delivers the notification in asynchronous mode. In order to compare the spreadsheet data, per CMS ID 5, spreadsheets may be maintained in the expanded format. Beyond CMS ID 5, rate sheets may be deleted from the uploaded spreadsheet format data.

Separate Logical Work Area for Processing:

In the case of a transaction that involves processing a large volume of data, the data is preferably moved into a logical work area, and the processing/validations done and finally stored in the actual tables which the rest of the application will later access. This approach preferably limits the amount of the data that various applications need to access a more distant memory location to access during a time-sensitive process. For example, when processing rate sheets, the rates from the rate sheets may be loaded into work tables of a database until all of the formatting rules and business rules are applied. Thereafter, the data may be moved into the submitted rates table of a database. This approach preferably improves the data retrieval during the rate sheet processing. There may also be separate tables to store the history of the rates and the rates from the last rate sheet.

Scalability

Archival:

Costing system 200 may receive hundreds of rate sheets per day (which may increase with the advance of time); provided however, the costing system may be configured to handle more or less rate sheets. Each supplier may submit one or more sheets, and the number of rate entries in the system is therefore likely to be very large. This large number of entries may affect the data retrieval process, the CPU, and the memory utilization of the database servers. Thus, in one embodiment, the costing system may archive information older than a configurable, predetermined date.

In one embodiment, a background process can run and move data from the active transactions tables to a historical database. In order to identify older data that, each record in the database can be maintained with time stamps for both a time/date of creation and a time/date of modification. The data with a creation or modified timestamp older than the predetermined date may be moved to the historical database. The creation and modified timestamps of the records may be established using Greenwich Mean Time. Moreover, tables may be partitioned based on the dates of creation and/or modification, since the submission history and current rates history tables are going to include a large quantity of data. All the key fields can be identified for all the important transaction tables, and indexes with proper priority can be defined for faster retrieval.

Clustering:

The costing system 200 may permit a plurality of concurrent users to work with the system, and the users may perform data-intensive operations which may lead to construction/loading of objects in the application server memory. Thus, to have better scalability and optimum availability of the costing system 200, the web server nodes can be configured in cluster mode using any suitable clustering system.

Flexibility:

Exhaustive system/supplier level parameters: The factors in the costing system that can change in future may be parameterized and may be configurable in the system (e.g. effective rate, supplier parameters, rate conversions and workflow related). A GUI can be provided to the administrative users of the costing system 200 to manage these parameters at the system level and at the supplier level. One or more of the parameters may be saved to the operational database. Any changes to the values of these parameters may be immediately effective in the system, and a few of the changes to the values of the parameters may trigger the background processes and repopulate/recalculate the data based on the changed values. Also the background processes are also configurable from the GUI to change the frequency or enable/disable the processes in the system.

Description of Transition from New Supplier Account to Fully Automated Rate Entry:

New account start process—(automated or manual promotion of Suppliers and their submitted rate sheets to different levels within the costing system 200). The new account start process may include, but is not limited to, one or more of the following steps:

(1) Start in Test mode. In one embodiment, the test mode process is similar to a semi-automated mode, but rate sheets may be prevented from entering the system and altering live costing data.

(2) After passing test mode, the system may run new rate sheets through semi-automated mode a predetermined number of times such as 1 or 2 times, or any other suitable number of times that may be user defined or configurable.

(3) After passing semi-automated mode the predetermined number of times, the system may run new rate sheets through automated mode with review (i.e., promote the process to automated mode with review) a predetermined number of times such as 1 or 2 times, or any other suitable number of times that may be user defined or configurable.

(4) After passing automated mode with review the predetermined number of times, the system may run new rate sheets through a fully automated mode (i.e., be promoted to a fully automated mode) unless problems arise to demote to the semi-automated mode.

(5) The system may return the rate sheets to semi-automated mode if any problems arise (a demotion relative to the degree of automation). Demotions may be defined by thresholds. In one embodiment, problems can be associated with or assigned numeric values based on formatting rules and business rules. For example, a rate sheet can accumulate a number of small problems (e.g., violate one or more formatting rules or business rules), but not get demoted because the sum of the numeric values associated with the accumulated problems is below a predefined threshold. However, some problems may be associated with very high numeric values and, when detected, may cause the demotion without accumulating additional problems because the very high numeric value is greater than a predefined threshold.

New Rate Sheet Processing

The intention of this process is to read/parse the rate sheet information based on predefined templates and store the parsed information in appropriate databases.

The new rate processing method may include, but is not limited to, the following steps:

(1) Once new e-mail is triaged into the database, the IB process 202 may invoke a processing component of the costing re-architecture system;

(2) The system may fetch the template details of the supplier from an appropriate tables or fields. If the supplier belongs to a sister group, then the template information should be fetched that is associated with a big sister of the group.

(3) If the template does not exist, the work tables are preferably not populated. When the user starts processing the rate sheet, the user may be navigated to a template setup screen.

(4) The system parses the first worksheet of a received spreadsheet.

(5) If the first row information is identified in the template, then costing system 200 starts reading the worksheet from that row. Otherwise, the costing system 200 may determine the first row as follows:

Ignore the first row with text data because its typically the heading information;

Rate information starts at the second row with text data;

Logos and Bitmaps may be ignored (6) Start reading the spreadsheet document, row-by-row until the last row is reached. If the last row information is not identified in the template, it may be determined as follows:

First row with no text data is considered the end of rate sheet.

Logos and Bitmaps may be ignored when determining the end row.

(7) For each row, read each cell and store as it is information in ratesheet format tables. If the template is not available, look for data in a first predetermined set of columns.
(8) Process the second worksheet.
(9) After storing all the information into ratesheet format table for a given rate sheet, the costing system 200 can execute a procedure, which uses template information and transfers data from ratesheet to appropriate work tables. If another rate sheet already exists for the supplier in the work tables, then the system stores the data in pre-work tables.
(10) In one embodiment, if the user updates the template criteria, delete all the copies in work and pre-work tables and repopulate the work table for the current rate sheet based on the updated template criteria. On successful submission of the current rate sheet, the system can apply the template for the remaining rate sheets.
(11) The errors detected by the costing system 200 are preferably stored in an error table. While working on the rate sheet, the errors can be stored in an errors table. The errors for history submissions can be stored in history table. The errors will be stored associated with a destination (e.g., a country).
(12) Upon completing a final submission, the data can be stored in submission history tables.
(13) The data may also be stored in live tables (scheduled and current rates). While saving the data, if the effective date is less than the current date, the data can be saved into current rate tables, otherwise, the data can be saved in scheduled tables.
(14) Scheduled and current rates tables may be de-normalized tables (merging destination, dnis, volume discount, time period and cost tables in work area).
(15) About once per hour (or any other suitable time frame), the costing system 200 can also run a job to transfer the rates from scheduled rates table to current rates table having effective rate less than current date.

Semi Automated Work Flow

Queue ordering process: The queue ordering process may include, but is not limited to, one or more of the operating characteristics.
(1) Default—sort by received date+notice period
(2) Ordering process is user configurable;
Assignment of rate sheet to user is based on a rate admin skill level. In one embodiment, rate admins can be assigned a numeric skill level of (1-6) and can be matched with the contents (information) contained in a rate sheet. An example of the contents of the rate sheets that could alter the skill level necessary to process the rate sheet may include (but is not limited to) any one or more of the following: advanced costing; bilateral agreements; mobile directs; number of changes in the rate sheet; deletions; increases; size; and LNP.

Automated Mode with Review Work Flow

This may be much the same as the automated process (see below), but the system may pause when the system stores rates and provides the user with a preview of what received rate sheet data has been added, changed, refused entry, etc. The automated mode with review may include the following operating characteristics.

The costing system 200 may present a user with pre-filtered data of what has changed.

For example, if a rate has increased from what is stored in the costing system—then the costing system may apply a notice date to the rate increase. In another example, if the rate decreased, then the costing system may immediately commit the decrease to system.

Automated Work Flow (if Rate Sheet Detection Fails Anywhere or if a Threshold Number of Problems are Detected, then the Rate Sheet Processing could be Demoted Back into the Semi-Automated Mode for Processing)

The automated work flow may include, but is not limited to, the following steps.
(1) Email arrives at an email server (such as a Microsoft Exchange server or any other suitable server).
(2) The costing system continues to checks the email server for new mail.
(3) If new email is detected, the costing system pulls the email from the email server and stores mail/contents/attachments in a database.
(4) The costing system performs a triage of the email, such as by checking the email against a white list (e.g., examining the email for included client & supplier ids against a known list of client & supplier ids).
(5) If the email triage is successful, the costing system sends the rate sheet contents to a rate sheet logical queue if a predefined file (e.g., excel, csv, or zip, etc.) is detected as attached to the email.
(6) The system determines the appropriate template to process the rate sheet based on account information determined from the email.
a. If a template not found, the costing system 200 may revert to the semi-automatic mode.
(7) The costing system 200 can process a rate sheet by checking the format of the rate sheet based on the template (the system can set system error thresholds before the rate sheet is sent to next step).
a. When errors are below the threshold level, only rates that have been determined to be errors are restricted from entering the system (and saved for confirmation notice email to the supplier and/or to costing system administrators)
b. If the read operation fails, reverts or is demoted to semi-automatic operation;
(8) System performs business rule check;
(9) If business rule check passes, the costing system 200 stores accepted rates;
a. If the business rule check fails, the costing system 200 revert to semi-automatic operation;
(10) The costing system 200 may send a confirmation of the rate sheet acceptance to a buyer and "whitelist" people associated with the rate sheet submitter's account;
a. Confirmation will include rates that are accepted and rates that were not accepted (such as rates that were determined to be errors);
(11) Other systems (Routing, Billing, Reporting) check reflex for updates to rates In one embodiment, the costing system uses an escalation process that can assign thresholds regarding how long pending operations wait in any one of a plurality of system queues.

In one embodiment, when the costing system 200 is processing rate sheet information in the automated mode, the costing system performs the same steps as performed in the semi-automated mode without user intervention.

FIG. 3 is a flow chart for a method 300 for receiving, processing and/or re-directing email message (i.e. triaging) in accordance with an embodiment of the present invention. The method starts at 302. Inbound email is triaged at step 304 to determine what type of incoming email message has been received. At step 306, the method branches depending on the type of email message that has been received.

If the message is determined to be a rate sheet 308, rate sheet processing occurs at step 310. The results of rate sheet processing may be sent to the costing interfaces 220, in step 312.

If, in step 306, the email message is determined to be correspondence 314, the email message may undergo correspondence processing at step 316, which may lead to the generation of outbound email correspondence in step 318. Thereafter, administration, auditing, and reporting functions may be performed in steps 324, 326, and 328 respectively.

FIG. 4 is a flow diagram of a method 400 for inbound email triage work flow in accordance with an embodiment of the present invention. The method 400 starts (402) with inbound email arriving at the server and then forwarded (404) to rate admins for evaluation of aspects of the incoming email messages. The method may then determine (406) whether the sender is on the white list.

If the sender is not on the white list (the query in step 406), the message may be sent to the challenge/response email response system (step 432). At step 434, autoresponder text (of type #2) may be sent in step 434. The method may then determine whether the supplier resolved the problem (step 436). If the problem was not resolved, the method (at step 438) does not process the rate sheet or correspondence, and notifies the buyer. Thereafter, the method ends at step 450. If the problem is found to have been resolved, in step 436, the method determines (step 442) what type of problem is present with the message. If the problem relates to authorization, the sender may obtain authorization in step 448. Thereafter, the supplier management may update the whitelist application (step 446). The system may then generate an email (step 444) notifying the supplier that the supplier's ability to submit rate sheets has been enabled, and inviting the supplier to resubmit the ratesheet. The method may then await the arrival of a new email from the supplier and start the process again at step 404.

If the problem with the email is determined (in step 442) to involve a typographical error in the CMS identification, the method may instruct the supplier (step 440) to fix the problem and to resubmit the email message with the corrected CMS identification. Thereafter, the method returns to step 404 to await a new email message.

Returning to the decision in step 406, if the sender is on the white list, the method may determine (step 408) whether a CMS (Contact Management System) identification is present in the header of the email message. If the CMS identification is present in the header of the email message, the method continues at step 410, at which point the method determines whether the sender of the email message is on an "exception list". If the sender is not on the exception list, the method continues at step 434, which was discussed above.

If the sender is on the exception list (from step 410), the method determines (step 412) whether the sender has only one authorized CMS. If the answer to the query in block 412 is yes, the method continues at step 428, at which the method sends auto responder text string #1 to the sender. At step 430, the method may send the process rate or correspondence to the CMS of the sender. The method then ends at step 450.

If the answer to the query in block 412 is no, the method continues at step 414, at which the method uses fuzzy logic to search for a match on the email address of the sender and on the offer name. At step 416, the method determines whether the match of step 414 is successful. If the match is successful, the method continues at step 428, then with step 430, and then ends at step 450.

If the match in query step 416 is not successful, the method continues at step 418, at which the method sends autoresponder text string #3 to the sender. Then, at step 420, the email address of the sender may be manually reviewed and identified. At step 422, the method determines whether the CMS of the email message has been identified. If the not, the system having received the email message may contact the supplier to resolve the problem. If the CMS of the email message has been identified, the method continues at step 430, and then ends at step 450.

If the determination in step 408 is that the CMS identification is present in the email message header, the method determines (step 426) whether the sender is authorized for the CMS identified in the email message header. If not, the method continues at step 434 which forms part of an execution branch of the method that was discussed earlier herein. If the determination in decision block 426 is affirmative, the method sends autoresponse text string #1 to the sender (step 428). The method then continues with step 430, and ends at step 450.

Figure 5A:
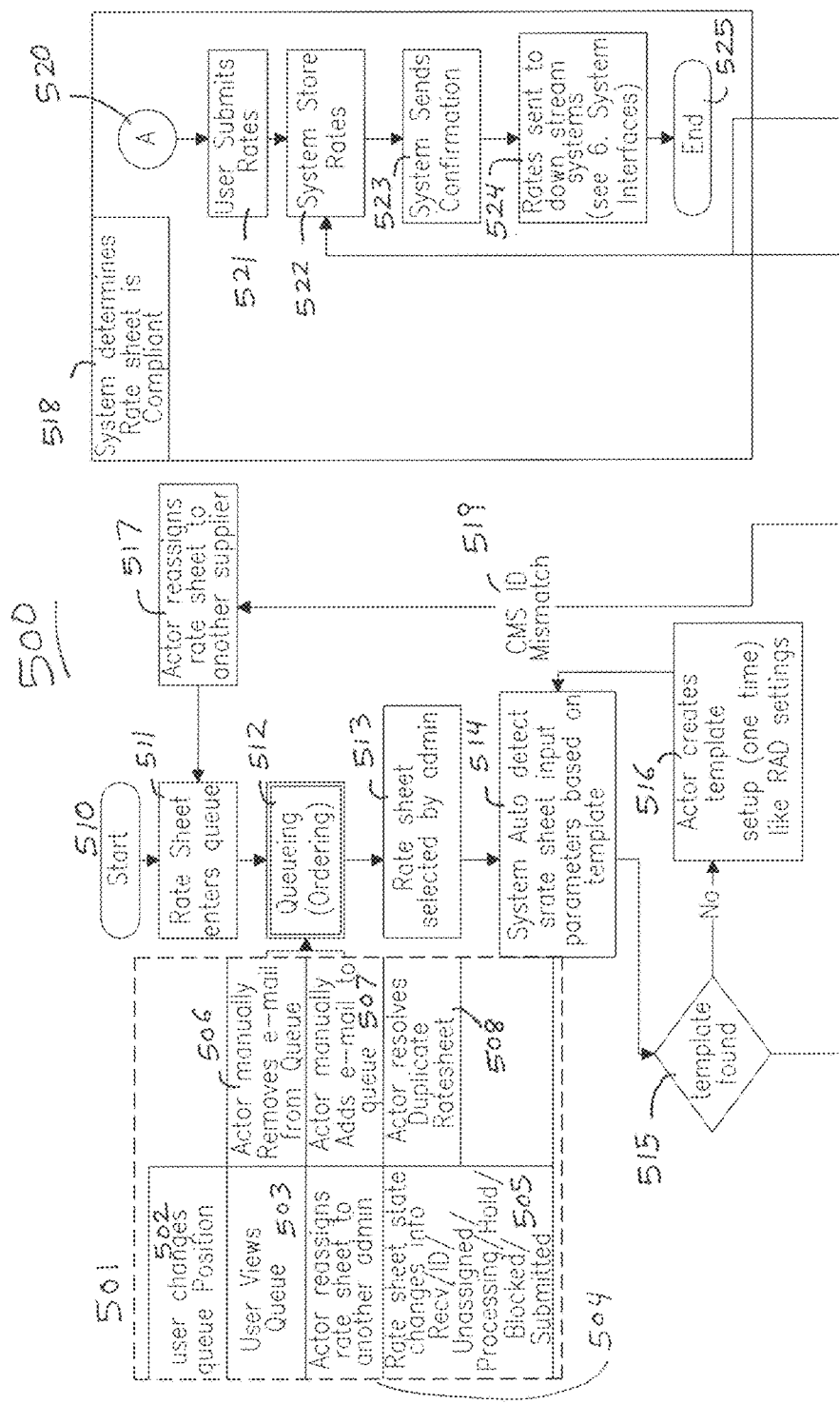
FIGS. 5A and 5B are flow diagrams of a method for semi-automated rate entry in accordance with an embodiment of the present invention.
Figure 5B:
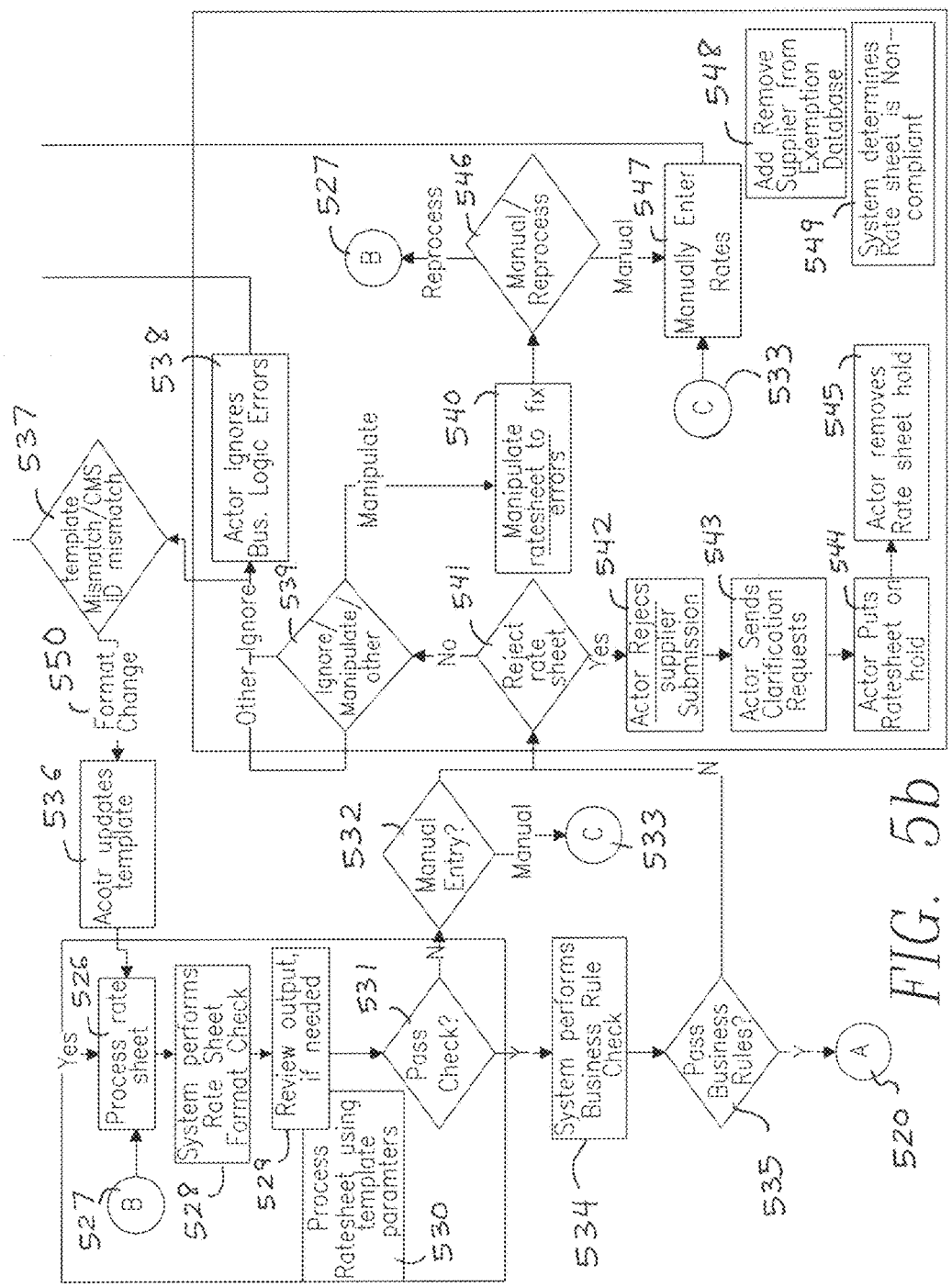
Figure 6:
FIG. 6 is screen shot of a user-interface screen visible to a user during a rate entry process, in accordance with an embodiment of the present invention.
Figure 7:
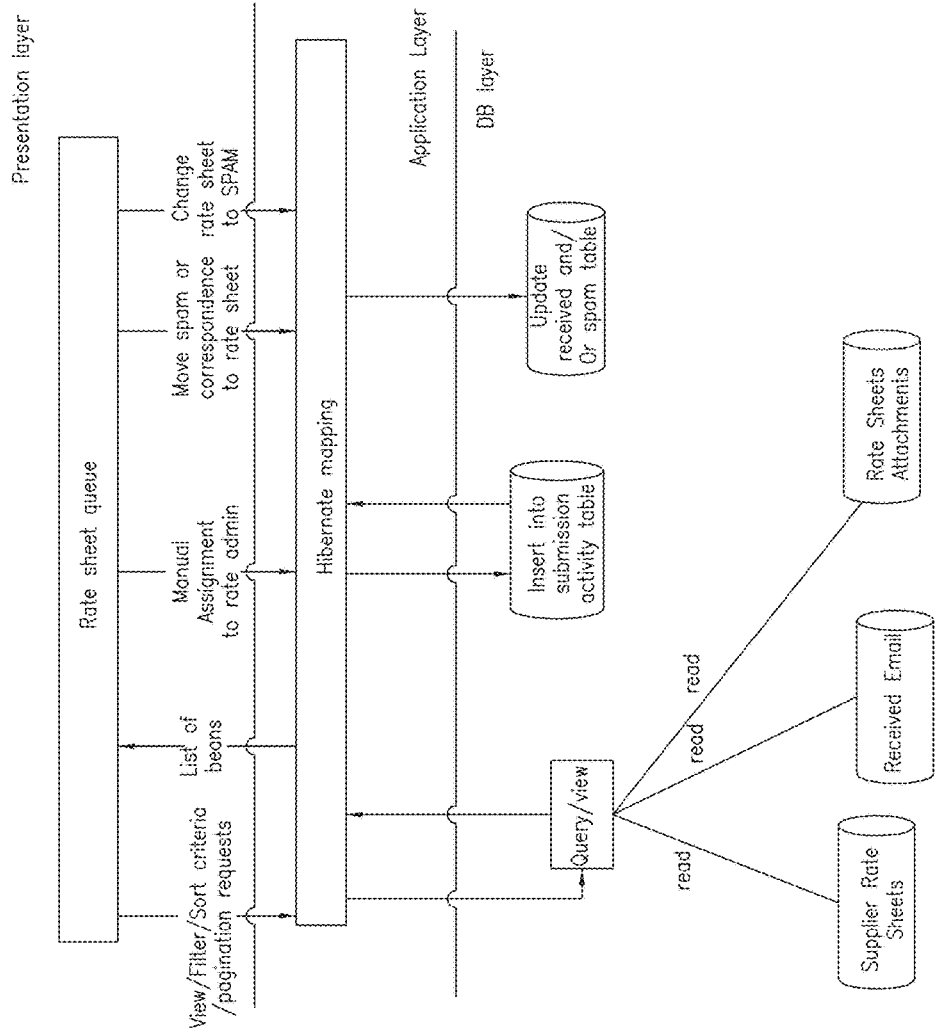
FIG. 7 is a block diagram showing information flow within a data processing center in accordance with an embodiment of the present invention.
Figure 8:
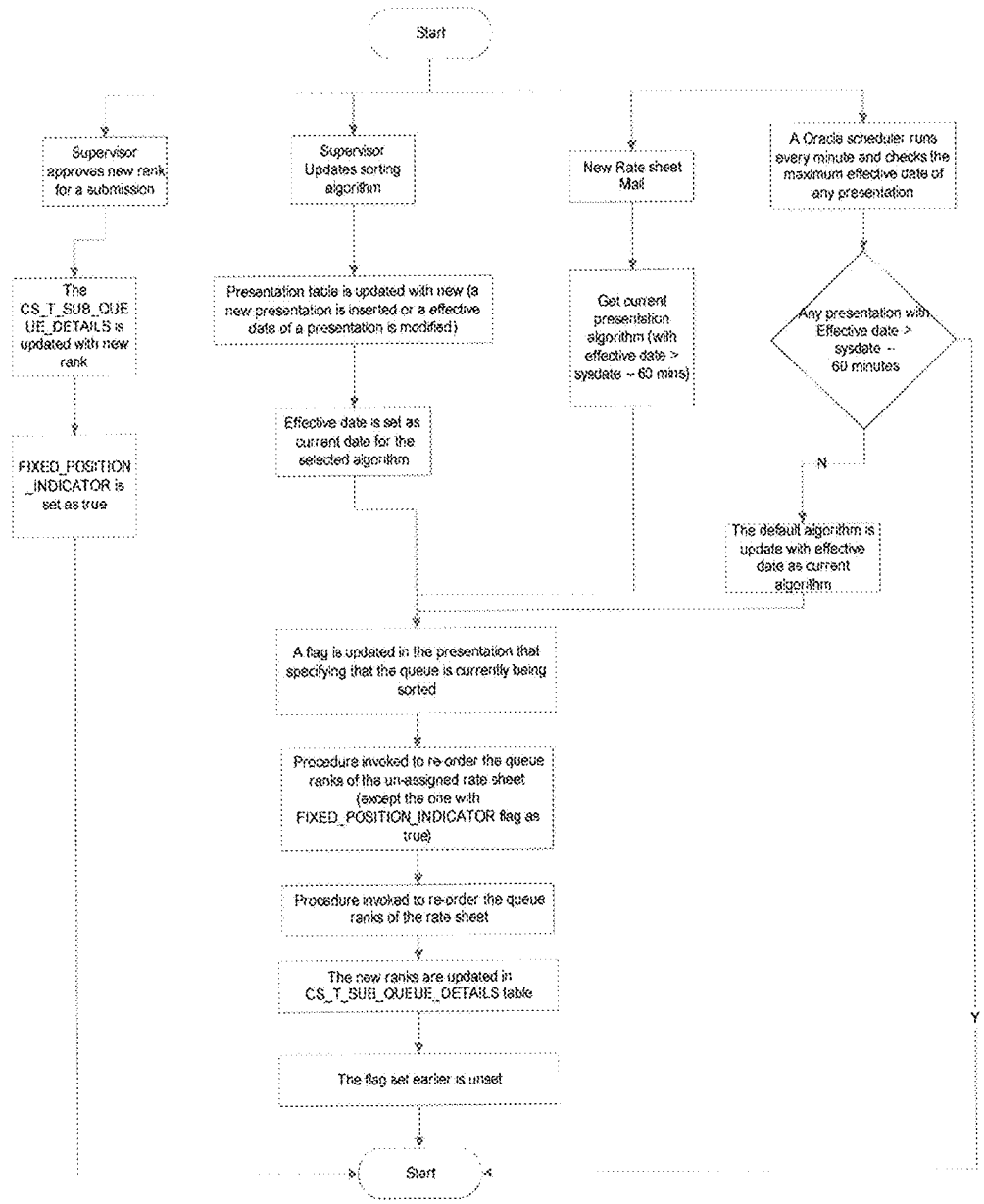
FIG. 8 is a flow diagram showing method steps for managing information flow within a data processing center in accordance with an embodiment of the present invention.
Figure 9A:
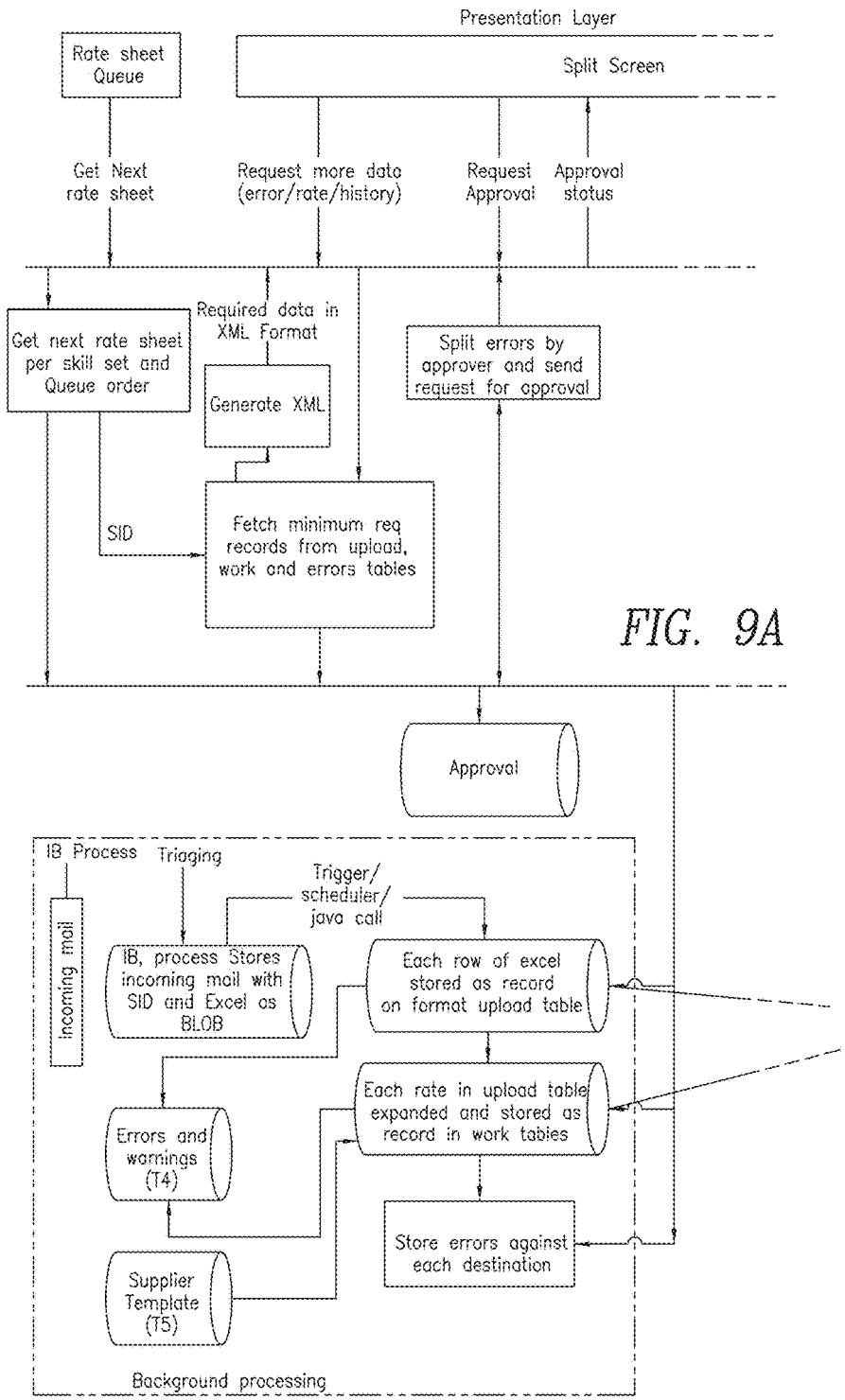
FIGS. 9A and 9B are a block diagram showing data organization, including a user interface, for information flow within a data processing center in accordance with an embodiment of the present invention.
Figure 9B:
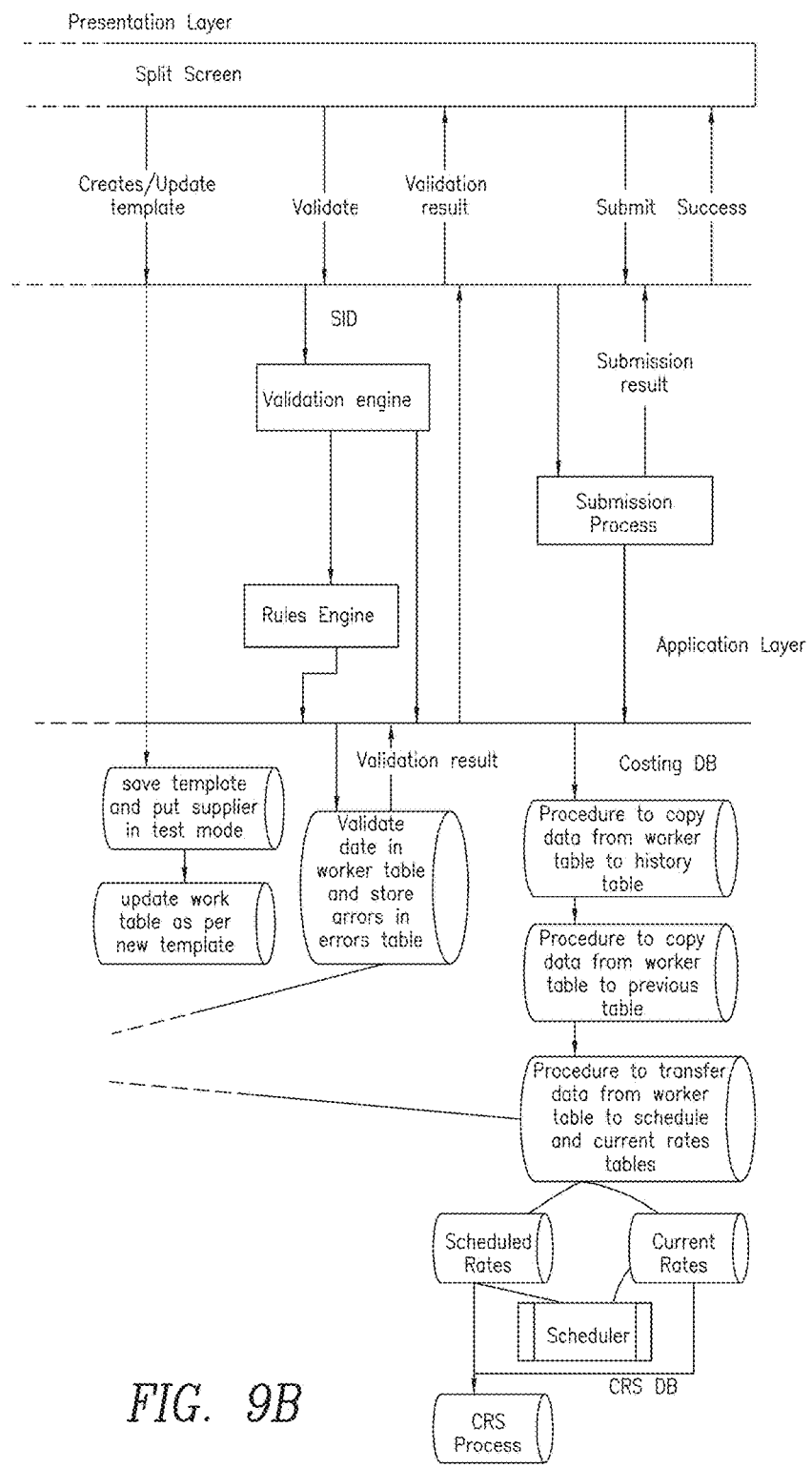
Figure 10:
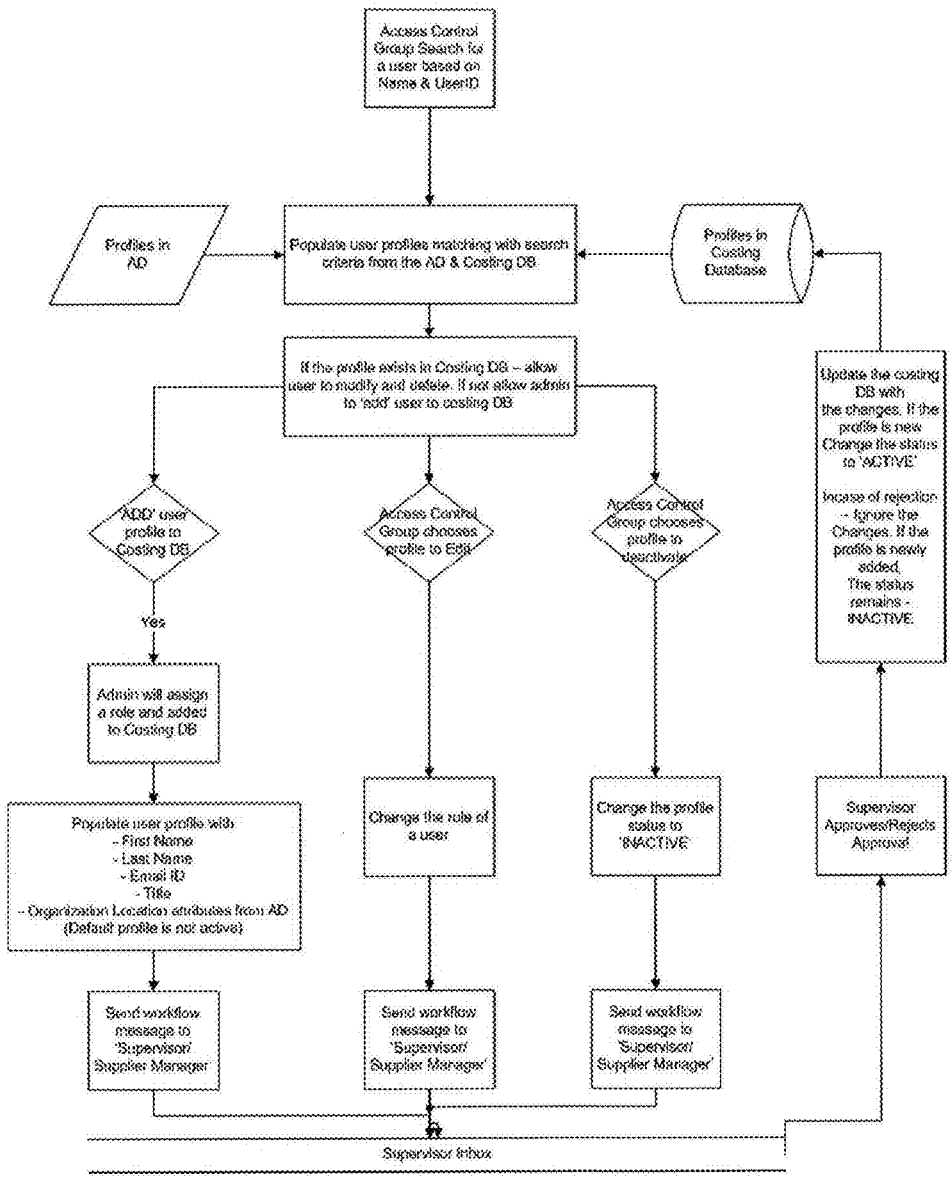
FIG. 10 is a flow diagram for a method of managing user information within a data processing center in accordance with an embodiment of the present invention.
Figure 11:
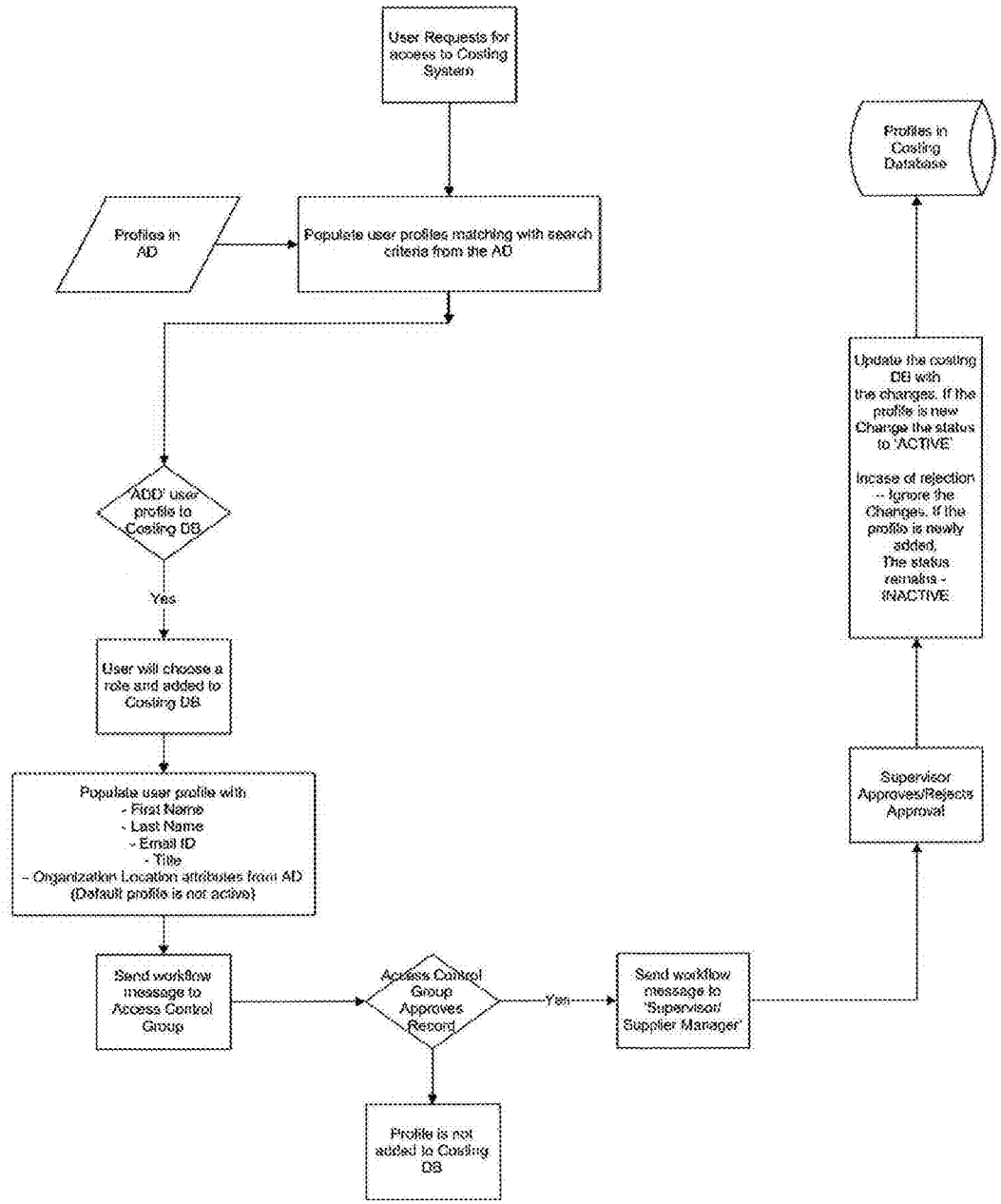
FIG. 11 is a flow diagram for a method of managing user information within a data processing center in accordance with an embodiment of the present invention.
Figure 13:
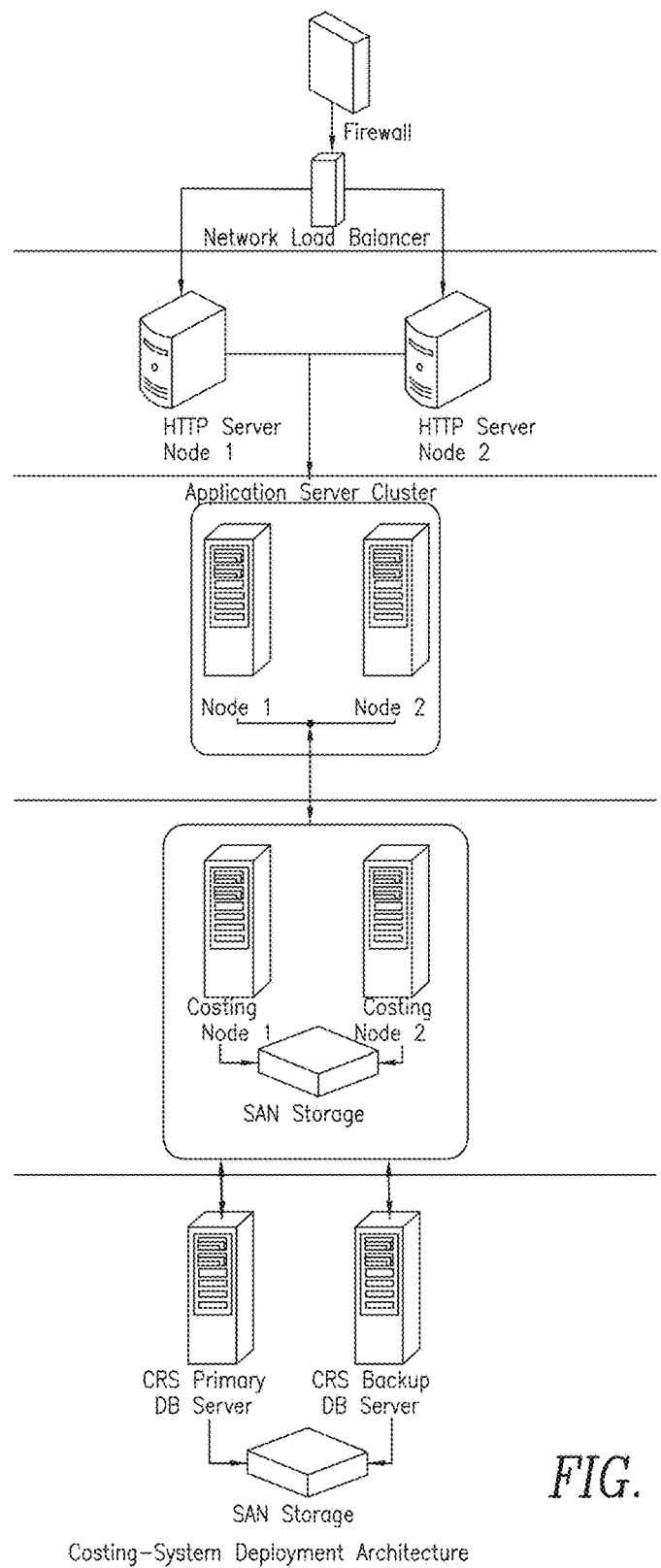
FIG. 13 is a block diagram of server architecture in a telecommunications data center in accordance with an embodiment of the present invention.

FIGS. 5A and 5B are flow diagrams of a method 500 for semi-automated rate entry in accordance with an embodiment of the present invention. The method may start at step 510. The rate sheet may enter the queue at step 511. At step 512, the rate sheets may be queued (ordered). Step 512 may include one or more of the steps included in block 501. Thus, step 512 may include the user changing the queue position of a rate sheet (502); the user viewing the queue (503); the actor reassigning a rate sheet to another admin (504); implementing rate sheet state changes (505) into the received ID where the available states may include: unassigned; processing; hold; blocked; and submitted. Step 512 may further include the actor manually removing (506) an email from the queue. Step 512 may further include the actor manually adding an email (507) to the queue, and/or the actor resolving issues of duplicate rate sheets (508).

At step 513, the admin may select the rate sheet. At step 514, the system may auto detect an srate sheet input parameter based on a template. At step 515, the method may indicate whether a template has been found. If not, the method may create (516) a template setup on a one-time basis, and then branches back to step 514.

If the template is found, in step 515, the method may process the rate sheet using parameters in the template at step 526. At step 528, the system may perform a rate sheet format check. At step 529, the output of step 528 may be reviewed. At step 531, the method may determine whether the rate sheet passes a checking procedure. If the check does not pass in step 531, the decision whether or not to perform manual entry of the rate sheet data may be made in step 532. If manual entry is to be performed, the method may continue at program node C 533, which is discussed below. If manual entry will not be performed, as determined in step 532, the method may continue at step 541.

If the rate sheet passes the checking process of step 531, the system may perform a business rule check on the rate sheet in step 534. At step 535, the method determines whether the rate sheet passes muster under the business rules. If the rate sheet passes the business rules, the method continues at step 520—also referred to as node "A" in the flowchart. The portion of the method that proceeds from node A 520 is discussed below. If the rate sheet does not pass the business rule check in step 535, the method continues at step 541 which is discussed below.

At step 541, the method decides whether to reject the rate sheet or not. If the rate sheet is rejected, the actor may reject the supplier submission at step 542. Then, the actor may send a clarification request to the sender of the email message, at step 543. The actor may then put the rate sheet on hold in step 544. The actor may then remove the hold on rate sheet, at step 545.

If the rate sheet is not rejected in step 541, the method may either ignore or manipulate whatever data is problematic in the rate sheet at issue, step 539. If the decision is made to manipulate the data, the method conducts the rate sheet data manipulation to fix any errors in the rate sheet in step 540. If the method decides to ignore the rate sheet data error(s), the actor may operate to ignore any business logic errors in the rate sheet, in step 538. Thereafter, the method may shift to step 522, which is discussed below.

Returning to step 539, if the method decides to ignore any rate sheet error(s), an additional processing path takes the method to step 537, at which the method determines whether the error arises from a template mismatch or a CMS ID (identification) mismatch. If the error arises from a template mismatch, the method may conduct a format change on the rate sheet (550), after which the actor may update the template in step 536. If the error arises from a CMS ID mismatch 519, the actor may reassign the rate sheet to another supplier (for which the CMS ID does properly match up). Thereafter, the method may continue at step 511.

Returning to step 539, if the system makes the decision to manipulate the data step 539, the rate sheet data may be manipulated in step 540 to fix any errors therein. Thereafter, the method may decide, in step 546, whether to process the rate sheet manually or to attempt to reprocess the sheet automatically. If the method decides to reprocess the rate sheet, the method shifts to node "B"—527, and execution of the method resumes at step 526, which is discussed above. If the "manual" option is selected, a user may manually enter the rates in step 547. Thereafter, the method may continue at step 522.

We now direct attention to program node A 520 in FIG. 5A. It is noted that block 535 of FIG. 5B branches to node A, and that blocks 538 and 547 of FIG. 5B branch to block 522, and thus skip step 521 of the five steps discussed in this section. With the foregoing in mind, the steps below node A 520 are now discussed just once below.

At step 521, the user may submit rates to the system. At step 522, the system may store the rates. At step 523, the system may send a confirmation. At step 524, the rates may be sent to downstream systems. The method may end at step 525.

Figure 2A:
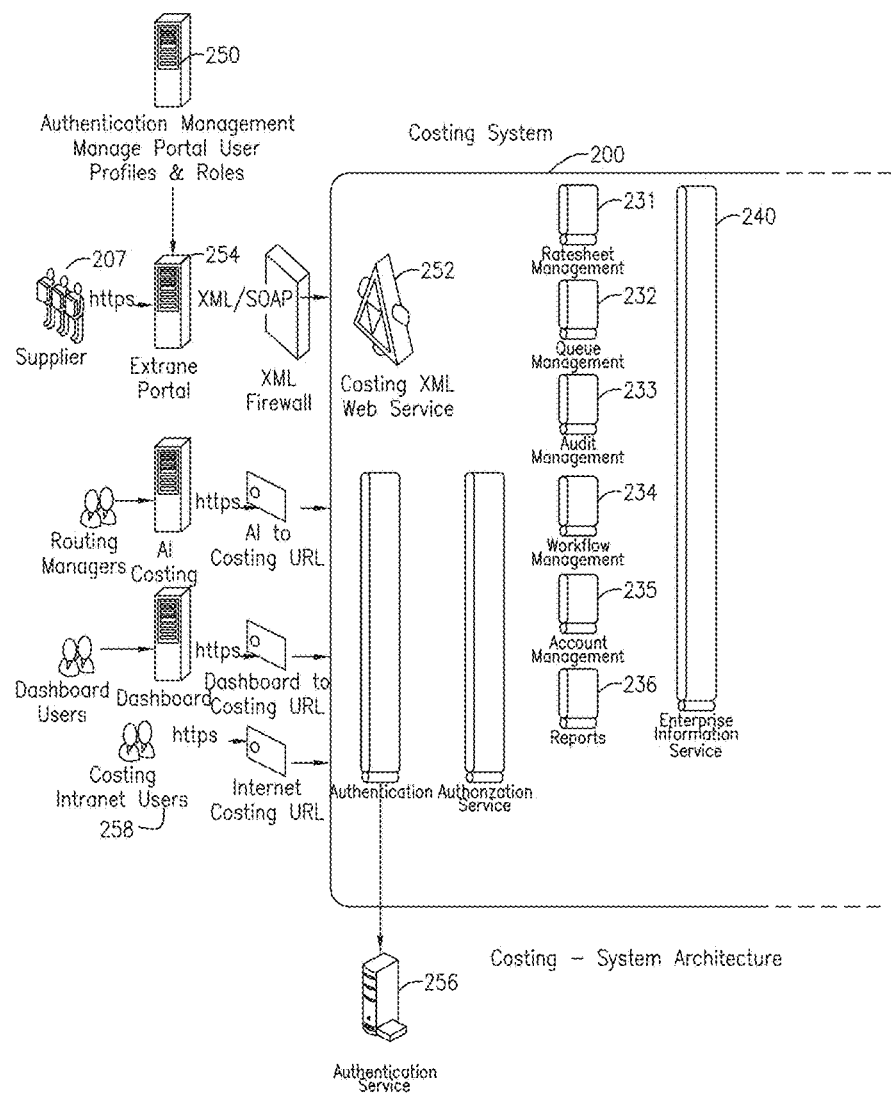
FIGS. 2A and 2B are a block diagram of a system for transmitting and storing telecommunication service rates in accordance with an embodiment of the present invention.
Figure 2B:
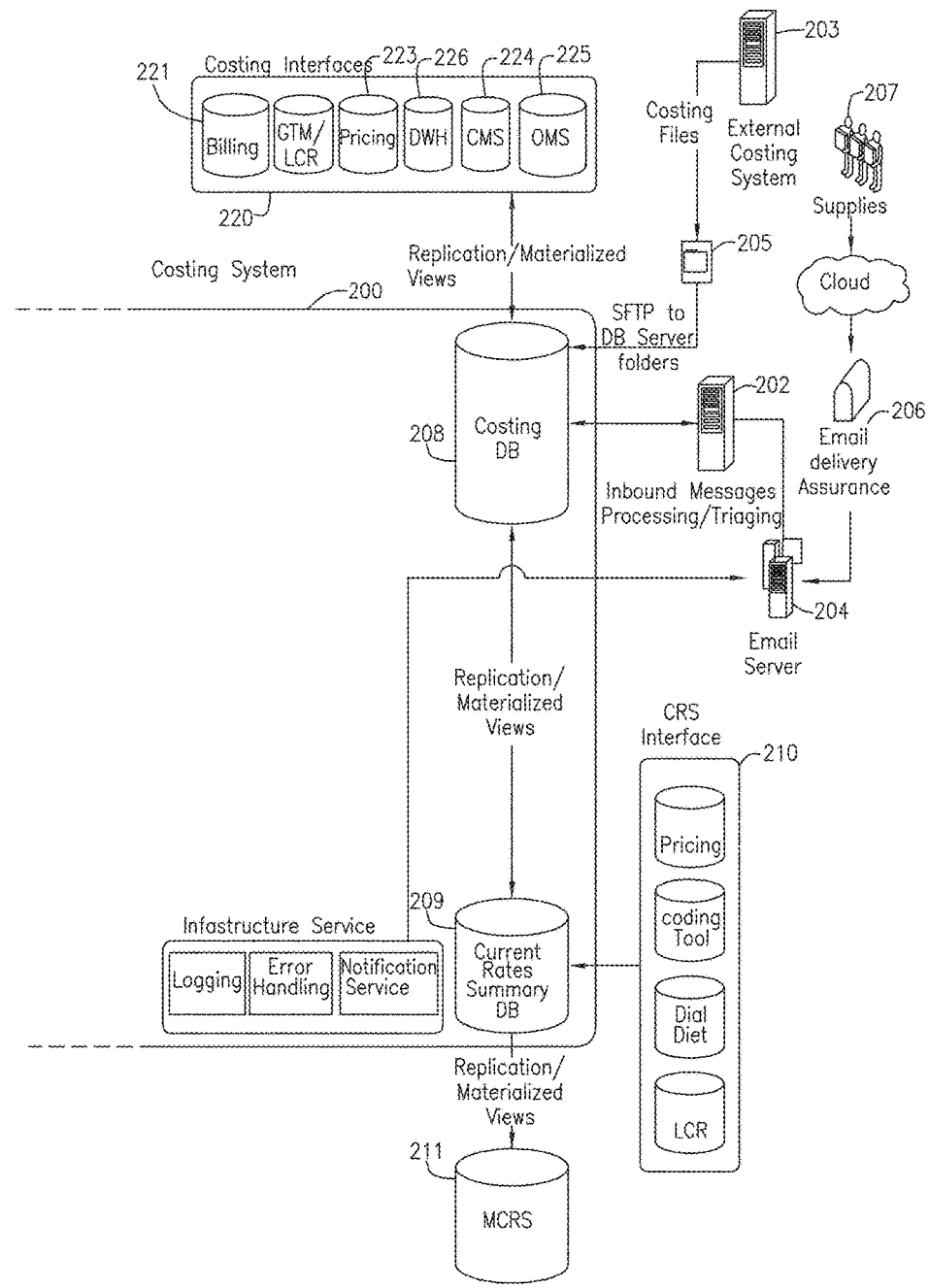

Proposed System Architecture:

FIGS. 2A and 2B depict the overall system architecture of costing application. The system has multiple user types such as 'Suppliers' and 'Intranet users'.

The costing system 200 may trigger the processing of rate sheets after receiving an email from Suppliers. IB process 202 can handle the triaging of mails from the suppliers. The suppliers 207 can send different categories of emails rate sheets, correspondence, among other categories of email messages. The unidentified mails can be considered to be spam mails. External email delivery assurance software may be used, which is configured to send/receive the confirmations to suppliers or from suppliers. Confirmation mails generated by the email delivery assurance 206 can be considered to be separate email and placed into the email server 204. The IB process 202 can read the confirmation emails and updates and direct the same to costing database 208. The email delivery assurance 206 can be configured on top of email server 204. The IB mail API can be deployed as an external application which will read the messages from email server 204 (external communication emails can be sent/received through a particular email address) and based on the whitelist rules, the emails can be triaged as rate sheets, correspondence and spam categories.

The IB process 202 may use costing database 208 to obtain a CMS whitelist configuration and also for storing emails received from suppliers 207. Once the emails are triaged based on the whitelist configuration, the 'Queue Management' module 232 can display the 'Ratesheet Queue' to the users. A user may choose the Ratesheet from the 'Queue Management' 232, which rate sheet can be processed by Ratesheet Management module 231. The rate sheet management module 231 may have different submission processing modes, depending on the supplier submission mode. System 200 may process the rate sheets received and may save the information to costing database 208. Audit management 233 may be used for reviewing the submissions processed by rate administrators as well as supervisors. Workflow management module 234 is a supporting module for one or more functional modules of the costing system 200 for exchanging the communications between different groups of costing system 200 and for approvals.

The costing system 200 may include different types of user categories. Supplier management users may be the main users of costing system 200, and others may be dashboard and/or routing users. Access to the application may be limited to the condition where the user profile exists in corporate active directory. In one embodiment, the authentication component in the costing system 200 may allow a user to access the system if the profile is valid and the user's credentials are verified against the corporate directory.

In one embodiment, there is not a separate login page in the costing application. For example, user details may be retrieved from the user's network login, from http headers, or using any suitable authentication mechanism. Upon obtaining successful user authentication, the user can generally receive authorization to proceed only if the user has valid privileges. Most users preferably have read-only default access. Users are generally allowed to perform transactions outside of the default access level if the user possesses a valid access level enabling such increased access.

The various different access levels may be defined in costing system 200, and a separate user management screen may be provided in the costing system 200 to assign the access levels to different users at the system level. The costing system 200 has a role management supporting module which enables the costing system users to define the different group access level in the application (supervisor, rate admin and supplier manager). Once the user is provided with access privileges, the user's profile can be stored in the costing database 208 (to track the transactions performed by the users). Requests received by costing system can be intercepted by an Authorization component in costing system 200 and can be compared with the access level stored in the costing database 208.

Other types of users who may be accessing the costing system 200 business functions may include suppliers (external users). These external users' profiles for various access levels may be stored in the authentication manager 250 (in portal). The external user can be authenticated and authorized by a portal security framework. Once the user is validated, the request can be forwarded to costing system 200 where XML, services 252 deployed in costing system 200, may enable one or more users to perform various types of business transactions in the costing system 200.

Apart from above mentioned business functions, the system 200 may include various supporting services like notification management, logging and error handling. The notification management service is a common function used to communicate with the external parties using a mail interface. Delivery confirmations can be handled by email delivery assurance 206 (part of the IB process).

The costing system 200 may also interface with various external systems to exchange data with the downstream systems such as billing 221, routing, data warehouse 226, customer management system 224, and the pricing system 223. Costing system 200 may interface with the billing system 221 to finalize the transactions. Rate entries available in the system may be exposed to billing system 221 as a database replication view to compare the rate entries in both systems. Further, billing system 221 may also expose a billing increment factor to costing system 200 for calculating adjusted effective rate (which is used by the routing system). System 200 may include an interface with routing and pricing system 223 to read the pricing and routing destinations. Another interface may be provided to read customer profiles from the coding and order management system.

The rates from an external costing system 203 may be merged into costing system 200 through the alternative rate entry system before sending the data to downstream systems. The rates from the external system 203 may be sent to costing system 200 through a FTP server 205. Files with the transmitted rates may be processed by costing system 200, and new rate entries from the external rate entry system may be updated to costing system 200.

In one embodiment, the costing system 200 may include a current route summary database 209, which may serve as a repository of current rates associated with all suppliers/destinations for a given target hour. In one such embodiment, a Current Route Summary (CRS) system 210 may interface with costing system 200. The CRS database 209 may read rate entries from the costing system 200, and generate the current effective rates for a predetermined time zone (or other time zone) (including rates from a rate entry system). The CRS system 210 may also interface with many other systems such as but not limited to Dial Plan, Coding Tool, Pricing and Routing. After generating the current effective rates, CRS system 210 may merge the data with Dial Plan to add gateway information. CRS system 210 may also get the restrictions applied in the Pricing and Coding tool and may merge the pricing and coding restrictions with the supplier restrictions.

A description of each of the layers of the Costing System is provided below:

Presentation Layer

The presentation layer is the layer which will handle the presentation of the entire application to the end user. The complete GUI functionalities can be managed in this layer. The functions that may be handled in the presentation layer may include: Creation of rate sheet templates; Managing whitelist; Rate sheet submissions; Auditing rate sheets; Report and Statistics of the submissions; Configuration of System & Supplier parameters; and User and Role Management.

The Web layer may provide the UI pages to enable users to access different functions available in the costing system 200 over a web and performing the activities substantial ease of use. The presentation layer may also include the report and statistics web interface where the user can obtain the latest summary report or statistics of the rate sheets processed.

The costing system 200 presentation layer may be governed by the authorization policy which is explained in detail in the Account Management module 235 (FIGS. 2A and 2B). The creation of Users and Roles in the System is performed through the web interface provided as part of the User Management process in the presentation layer. Data on the pages may be loaded asynchronously to increase the response time, and to preferably reduce the network traffic.

(1) Business Layer:

The business layer may operate as the core of the costing system 200 and may also determine the outlook of the web interface which will be provided to a user. The Business layer may also manage the processing of the data and may transfer data from presentation layer to the data services layer.

The business layer may include the following business systems/processes: Rate sheet submission; Workflow management; Audit; Adjusted Erates; Notification; and/or CRS.

Operational Concepts and Scenarios

Update of Currency of Record (COR): Suppliers may provide the rate sheets based on their Currency Of Record. While saving the rates provided by suppliers in the costing system 200, the system may convert the rates into a predetermined currency. A feed may be provided by the external system to Costing system 200 of currently prevailing conversion rates on a daily basis (or some other suitable periodic basis, such as hourly, monthly or other period). Whenever new currency rates are received, based on the currency modified date, a background process may trigger and update the effective rates/adjusted effective rates for one or more of the suppliers.

Update of Greenwich Mean Time (GMT) Offset: Currently, the suppliers 207 can provide rates based on the time zone in which they are operating (Time On Record). Based on the current offset values, the system 200 may convert the effective dates and start time & end time of the supplier rates to GMT time zone. Whenever the time zone offset is updated, a feed may be received from a time zone offset system. A background process in the costing system would update the effective dates and start & end times of the current & scheduled rates based on the new time zone offset.

We now direct attention to the Date & Time Zone to handle transactions in costing system and also for calculation of current rates. The supplier may submit rates in different time zone from that in which the costing system 200 is located. The suppliers who provide rate sheets may have different time zones, and the offset (day light savings etc) may vary from time to time. Thus, the system can maintain the supplier provided time zones unchanged when the rate sheet is being processed. When the current rates are getting generated, the effective dates are going to covert to the GMT time zone for showing it to rate admins while processing the rate sheet. At the same time, whenever CRS processing is going to run, CRS processing may recalculate the current rates at a predetermined frequency and save it to the CRS database. In order to avoid the recalculation of current rates every time based on the supplier-provided time zone (since the offset is not going to be changed very frequently) the CRS system may pre-calculate and save the information into current rates. The current rates may be shown to the supplier, so everything may be shown in GMT time.

If a user would like to view the previous rate sheet while processing the rate sheet or during the audit process, the offset of the respective time zone may be picked up from the time zone table and shown to the user based on the offset was configured at that time or based on the date on which the submission was received. Another approach that can be followed is to store the both the effective dates while saving the information in Current & Scheduled rates. While presenting the rate information on a display for the admins & supervisors, rates in the supplier-provided time zone displayed for the CRS process may use the GMT effective date. However, the system may handle one or more of the transactions and interfacing with the other systems in GMT.

The user first name and last name may be displayed on a header when the user logs into the system. Also the user should be able to create an email list with the buyers', supervisors', and rate admins' email identifications/addresses. When a particular user is assigned with specific role in the costing system 200 (otherwise default is read-only role), the user profile, which may include the first name, the last name and email id may get populated in the costing database (the status of the profile in the costing system would also maintained separately in the costing system). The same user id may be maintained in the costing system 200, and that will be the key to identify the user access level and also for the auditing purpose (created by and modified by). In the case where a user is deleted from the corporate directory, the user may be deactivated in the costing system 200 by an administrator or any user who has the access the account management screen. However, users may be prohibited from deleting themselves, or other users, from the costing system 200. Once the users' information is populated into various fields in the costing system 200, on successful authentication, the system will check whether that user's 'user id' is present in the costing system 200. If the pertinent "user-id" is found, then the system may display the first name and last name of the user from the costing system. Otherwise, the system may connect through a lightweight directory access protocol (LDAP) service and retrieve the first name and last name of the user (read-only users). During the creation of an email group list, information describing active users with email ids may be displayed on the screen.

Locking a CMS ID (Contact Management System Identification):

In order to avoid processing multiple rate sheets belonging to same supplier by the system, the CMS ID (supplier) may be locked before beginning processing a new rate sheet. In one embodiment, until the lock is released for that CMS ID, the system may prevent any other user to process the rate sheet for that supplier.

In case the system receives more than one attachment from the supplier, the submission mode may change to manual mode. This approach may apply for one or more of the below-listed scenarios (or whenever the system is unable to determine or process a received attachment): (a) the number of attachments is more than one, and the supplier-provided rate sheet includes more than two worksheets; (b) the document format is Microsoft® Word; (c) the attachment format is PDF; (d) the rate sheet is included within body of an email; or the rate sheet is part of a web page or URL. In one embodiment, when an application servers or a database is unreachable, if the costing system 200 is configured with multiple application servers or databases, the load/user sessions may automatically failover to a reachable authentication server 256.

We now consider a situation in which the costing system 200 is down, but the portal is up and running. If the costing application is down or the web services are not accessible from the Portal application, an event can be registered in the portal application to notify the operations team.

In one embodiment, where the costing system includes the CRS system, two independent CRS systems may be used (e.g., a primary and secondary CRS system). A system that accesses one of the CRS systems (e.g., a routing system) may switch over from primary to secondary or vice versa in case any one of CRS system servers are down. Moreover, the CRS-configurable parameters like 'target time off-set for primary' and 'target time off-set' for backup would be maintained as part of the system parameters. A view may be provided to CRS database from the costing system 200 to read these parameters. The same parameters may allow the end user to modify these parameters through a system parameter screen. To improve the performance of CRS system running on the primary server, by default it may use the CRS output generated by the backup server. The backup server generates the current rate output for a predetermined period of time ahead of the primary server, thereby enabling the primary server to find a CRS output for a different predetermined time period less than the predetermined period of the backup server. The primary CRS server may commonly use the output generated on the backup server as long as the following conditions are met:

(a) The Backup server is available to read the CRS output by Primary server;
(b) There is no changes in the rates;
(c) There are no changes in costs and effective rate parameters;
(d) There are no changes in time zone offset; and/or
(e) There are no changes currency conversion rates.

If any of the above conditions have not been met, the primary server may run the process to generate the CRS output for an hour.

Costing Modules

Queue Management, Rate Sheet Processing, and Participants in System Operation:

Rate Admins: Rate Administrators are among the main users of costing system 260. This user group may process the rate sheets sent by suppliers and may also be involved in audit process to find discrepancies in the processed rate sheets against original rate sheet. Employees of one or more companies may be included among this user group.

Supervisor, Manger, Supplier Management: employees of telecom companies may belong to this user group. They may assist a rate admin team in solving rate-entry related issues and may also be responsible for providing approvals to the rate admin team for processing rate sheets sent by suppliers. Supervisors may also use the costing system for entering the rate sheets into the system.

Director: This user group may be responsible for approving business rules exemption and other approvals.

VP: This user group may be responsible for approving rate increase and retro rate increases among other requests.

Functionality

Generic Flow: The queue management page may use asynchronous processing calls for most of the requests. Once the user initiates a request, JavaScript code initiates the asynchronous processing call to a server by passing on the criteria as request parameters. The action component of the business layer may accept the request and invokes the corresponding method in the handler component. The handler may invoke the data access object (DAO) layer. The presentation layer may use an Apache Struts framework. The data may flow between the j sp and the action classes using the struts framework. The dhtml component may be used to display tabular data in many pages.

View Rate Sheets

By default, the system can fetch unassigned rate sheets from a submission and received email tables. Based on the role (rate admin or supervisor), the system may also render the extra controls.

Filter/Sort Criteria

Presentation logic in the queue management page may send a request to the server based on sort and/or filter provided by the user using an asynchronous processing call. The server can fetch data as per the criteria and return the result as a list of beans. The data in the page may be refreshed based on the response. This sorting/filtering may be at the presentation layer. It may not change the original rank of the rate sheet in queue. It may customize the view as per the user requirement. Once the page has been sorted, the current page may be retained and shown in the sorted order. When a user sorts the rate sheets, the system may sort all the rate sheets as per the criteria and display first page to the user.

Supervisor Overrides the Sorting Algorithm

If the supervisor requests an update of the sorting algorithm, the system may create a new presentation in a 'Queue presentation' table and a corresponding algorithm (the columns used for sorting and their sequence) may be stored in Queue sorting table. The system may then validate out-of-sequence processing by comparing the received dates within rate sheets of the same supplier (sister group).

Supervisor Manually Changes Queue Rank of a Submission

The new queue rank for a submission may be updated in the submission table, and the system may also set the 'fixed position indicator' to "true." The system then validates out-of-sequence processing by comparing the received dates within rate sheets of the same supplier (sister group).

Sorting (Reordering) the Queue:

The method of sorting the queue may include one or more of the following steps:

(a) The algorithms may be defined in the queue presentation table. This table may include various custom defined reordering algorithms. The queue filter table may include column names which can be used for creating custom reordering logic. For creating a reordering logic, filters may be picked up from the queue filter table and inserted in queue sorting table with suitable business logic (e.g., process column 1 first, then column 3, etc). After reordering, ranks will be reassigned to the rate sheets, that is, we can again start from rank 1. However, if the supervisor has given priority to a particular rate sheet, after automatic reordering, the priority may remain unchanged. In one such situation, only the remaining rate sheets rank will change.

(b) One of the algorithms may be marked as default algorithm. While setting up the application, the system may create a 'SEED' algorithm and set it as default algorithm.

(c) The system may create a scheduler, which invokes a procedure about once a minute, which checks whether the system can reorder the queue based on the effective date of the algorithm and the configurable time parameter (60 minutes).

(d) Whenever a new rate sheet is inserted by the IB process, the system may reorder the queue based on the current algorithm (either the default or the one created by the supervisor).

(e) About every 60 minutes (a time period which is configurable, i.e. alterable), the system may reorder the queue based on the current algorithm. The reordering of the rate sheet queue may be a background process. It is possible for a user clicking the "get rate sheet" button to get the next rate sheet when the background reordering process is going on. There is a possibility of the user getting a wrong rate sheet in such a scenario. In order to avoid this problem, once the reordering background process starts, one flag may be set. Based on this flag value, the user will get an error message indicating that the reordering is in progress and the user should try after some time. Once the reordering process completes, the flag will be reset.

(f) Once the supervisor manually changes the sorting algorithm, the system may immediately re-order the queue. If a new rate sheet is inserted during next 60 minutes (or other suitable time period), the system may reorder the queue based on supervisor's algorithm.

(g) If the supervisor has given priority to a particular rate sheet, and then one hour (or other suitable time period greater than or less than one hour) expires, and the default seed algorithm is applied. The rate sheet for which the supervisor gave priority may remain on priority. All other rate sheets may be reordered by a SEED algorithm.

Default queue sorting: In one embodiment, a rate sheet submission to be processed is the one that has the Soonest Estimated Effective Date (SEED), where SEED may be based on a receive date and a contractual notice period in system. In case of a tie, the secondary sorting criteria is the receive date itself. Submissions received earlier should be processed sooner. Supervisor may temporarily override default sorting for one, some or all submissions using any combination of: 1. SEED; 2. Queue Rank; 3. Family; 4. Sister; 5. CMS ID; 6. Company; 7. Received date; 8. Termination traffic in last predetermined number of days for a particular CMS; 9. Number of destinations on the rate sheet; 10. Number of increases/decreases/rates; and 11. Using a combination of columns. In one embodiment, when a submission for a given CMS (or its sisters) is being processed, no other submissions for that CMS may be processed; they are temporarily "locked out" and may not be assigned or removed from the queue. There may be a visible indicator of this condition to the user. For example, if CMS 12345 has 5 submissions in the queue and an Admin or the system is processing one of those submissions, the other 4 submission will remain in the queue (and not be assigned to an agent automatically or manually) until the current submission is fully processed, or killed.

(1) A supplier is switched back to processing when a rate admin successfully submits a rate sheet that removes them from the inquiry state.

(2) Every time there is a new email we will re-order the queue. Also, there will be other events that can trigger reordering e.g. change in sorting rule, etc.

(3) In one embodiment, when the CMS ID is not included in the subject line by the sender, it may be unclear what the target CMS ID is, as there may be multiple CMS IDs authorized for that sender. For the sake of queuing the submission may be ordered per the most stringent CMS ID criteria in the list e.g. If the email can be fuzzy matched for 3 CMS IDs and if one of the CMS ID is on inquiry, then it will queue based on that CMS ID or if one of them had less notice period that others it will sort based on the that CMS ID which had shortest notice period.

(4) The queue may reorder itself every 60 minutes per the algorithm (this time value can be modified in the global setup area).

Queue related Approvals:

(a) Once the rate admin raises a request for approval, an approval table may store the type of approval of that CMS. The table may also store all the parameters in the 'Params' column in a key-value pair separated by a semicolon.

(b) Once the supervisor approves the request, the system may process the request based on the approval type and the parameters.

(c) Until the request is pending approval, the rate sheet is preferably not assigned to any rate admin.

(d) If the approval request type is for reassigning the rate sheet to another rate admin, the system may set the status flag for all the rate sheets in the queue for the CMS to enquire about.

Handling Incorrectly Identified Entries (Rate Sheet Emails that were Incorrectly Identified as Spam Mail, General Correspondences)

(a) Once the supervisor marks the correspondence as a "Rate sheet", the system may update the queue type column in the Received Email type as a Rate sheet. The system may also remove a corresponding entry from the 'Correspondence Ext' table.

(b) Once the supervisor marks the spam email as a 'rate sheet', the system may move the record from spam table to received email table.

(c) The system may create the submission entry into the submission table.

(d) The system may store the attachment into a submission attachment table.

(e). The costing system 200 may include a database table that can track the movement of records from corresponding/spam to rate sheet tables. This may help in maintaining the audit trail for such records. After moving the record, the process to populate the upload and work table may be invoked.

Marking the Rate Sheet as Correspondence or Spam (a) If the supervisor marks the rate sheet as spam, the system may move the record from the received email table to the spam table. The system may also remove entries from the submission and corresponding attachment table.

(b) If the supervisor marks the rate sheet as spam, the system may update the queue type column of received email table to correspondence. The system may also remove entries from the submission table and move the attachment to the corresponding attachment table.

Reassigning Submission to Another Admin (a) If the supervisor reassigns the rate sheet to another admin, the system may create a new entry in an email assignment table. The earlier assignment may be marked as invalid. Comments on the change and/or the reasons therefor can be saved.

(b) While assigning the rate sheet, the system may check the CMS id of the rate sheet and verify whether there is another rate sheet from same supplier (or sister group) assigned to different rate admin. If the system finds such a rate sheet, the system may indicate the presence of an error.

Rate Sheet Processing

Back to Back Rates

The costing system 200 may fetch data from scheduled rates table and work tables. The costing system 200 checks if a rate exists in the scheduled rate for a DNIS having an effective date after the effective date in the work table for the same DNIS.

LNP (Local Number Portability) Rates:

(1) The mappings between supplier current network name and telecom-company network names may be stored in a INP mappings' table.

(2) If the costing system 200 encounters a destination without a code and the destination name mapping doesn't exist in the INP mappings' table, the system may prompt a rate admin to create a mapping in the mapping screen.

(3) The LNP rates may be stored as normal rates without any entry in DNIS table.

(4) If the mapping exists for the destination name, the system may set a flag in the destination table specifying that it is an LNP rate.

(5) Even after final submission the rates are preferably not passed to the downstream system unless the mapping is marked as approved by the Supplier.

(6) The threshold configurations may be stored in a 'LNP_threshold' table. This table may also store time based (advanced) rates.

Handling Duplicate Rate sheet:

(7) The costing system 200 may track the last 5 (or other suitable number) of uploaded rate sheets for a supplier. The costing system 200 may run a comparison of a newly submitted rate sheet to the one or more of the previously submitted rate sheets associated with the supplier (or a sister group) to determine if a new rate sheet submission is a duplicate submission. The system may send a mail to the Supervisor, Buyer, and Supplier to notify these parties that a duplicate rate sheet was submitted to the costing system 200. The duplicate rate sheet check may be omitted during submission of data.

(8)

Manual Rate Entry (9) If the rate sheets are received in some other format (other than in a spreadsheet attached in the mail), the rate admin may process the rate sheet manually.

(10) The costing system 200 may reload rates from a prior rate sheet submission associated with the supplier and provide the rates from the prior rate sheet to the user in a web page. The costing system 200 may provide the user an option to edit the prior rate sheet data and submit the edited rate sheet information or alternatively upload a new spreadsheet file.

(11) If user merely edits the rate sheet data (rates from last submission), and submits the new rate sheet data, the system may perform a business rules check and proceed to a final submission page.

(12) If the user uploads the new spreadsheet file, the system may save the file into a submissions attachment table. The system may then invoke the process to parse the spreadsheet file and store the data in the appropriate database. If the user again uploads a new spreadsheet file, the existing spreadsheet file data stored in the database may be overwritten. The costing system 200 may then parse the new spreadsheet file and store the data in the appropriate database. In the event that the rate sheet passes the format check, the system may provide a user with a display of a current rate sheet and an uploaded rate sheet side by side in a split screen format.

Audit

In one embodiment, the Audit module may provide an interface to the party (Auditor/Supervisor) for auditing the processed rate sheets submitted by suppliers through email only. The system may include manual and/or automated modes for auditing the rate sheets. The process for auditing rate sheets may include, but is not limited to, practicing one or more of the steps listed below.

(1) A Menu may be displayed based on access rights.

(2) When a party/entity clicks "Get Rate sheets" (Automatic), one or more the following may occur:
  i. The costing system 200 may retrieve rate sheets based on the default sample criteria limiting to the sample size;
  ii. The default sample criteria can be overridden by supervisor;
  iii. Rate sheets may be displayed by descending order of date submitted.

(3) When the party/entity clicks on "Submitted rate sheets," one or more of the following may occur:
  i. The System may retrieve rate sheets based on the default sample criteria's date range;

ii. The default sample criteria can be overridden by supervisor;
iii. The Rate sheets may be displayed according to descending order of date submitted.
iv. The party/entity may apply filters to the rate sheets displayed;
v. The party/entity (which may also be referred to as an "actor") may remove applied filters.

(4) Supervisor Assignment:
i. The party/entity may click on submitted rate sheet;
ii. The party/entity may assign one rate sheet to a particular auditor;
iii. One or more of the auditors may be populated from costing based on role;
iv. That information may be captured in the system;
v. When the assigned auditor goes to "My Audit link", the above assigned rate sheet may be pending for auditing for that auditor.

(5) Supervisor Approval:
i. The system may retrieve one or more of the rate sheets pending approval for that party/entity/actor;
ii. The Actor may Approve, Reject, and/or Initiate Re-Processing auditing;
iii. The details may be received and stored within the system;
iv. If the actor initiates the re-processing the rate sheet, the rate sheet may be re-submitted for processing again.

(6) The Sample Criteria for selecting rate sheets may be based on one or more of the following system parameters:
i. Date Range—From, To dates;
ii. Sample size;
iii. The percentage of the sample for category 1;
iv. The percentage of the sample for category 2.

(7) The supervisor may be able to override the default criteria. This functionality may be implemented as part of Account Management module.

(8) Remove rate sheet. The method for removing the rate sheet may include one or more of the following steps:
i. Remove the selected rate sheet from that actor;
ii. In this embodiment, rate sheet removal can be performed only by a supervisor.

(9) Re-assign rate sheet for audit:
i. A selected rate sheet may be removed from one auditor and assigned to another auditor;
ii. In this embodiment, the task of re-assignment can be performed only by supervisor.

(10) Filter:
i. Actor can apply/remove any of these filters: (1) Destination; (2) City Code; (3) Effective Date; (4) Error; and (5) System Changes.
ii. The auditor can save these filters;
iii. The auditor can retrieve rate sheets based on the saved filter criteria.

(11) Performing Audit:
i. An auditor may select a rate sheet for auditing from a auditing menu;
ii. The costing system 200 may generate a split window display with original submitted rate sheet (received from supplier) and processed rate sheet (Actor/Auditor processed rate sheet) on other side and the auditor can change the view to display rate admin processed/submitted rate sheet information;
iii. The costing system 200 may provide an auditor with the comments and discrepancies at a destination level within the rate sheet data; (iv) the costing system 200 may provide an auditor with comments and discrepancies for all of the data submitted in a particular rate sheet; (v) the costing system 200 may provide an auditor with the success/error for rate sheets; (vi) Error/defective rate sheets may be available in "Audit Rejects"; (vii) the costing system 200 may provide an auditor with an option to re-process a rate sheet or submits the rate sheet to a supervisor; and/or (viii) the audit report details may be captured in the system.

(12) Approving Audit:
i. The actor may select a rate sheet for auditing from Audit Approvals;
ii. The actor may be shown a split window with original submitted rate sheet and processed rate sheet on other side along with comments entered by the Auditor;
iii. The actor may override the comments. The detected discrepancies may be at the destination level for the rate sheet;
iv. The actor may override comments and the detected discrepancies may be for all of the data submitted in a particular rate sheet;
v. The actor may either approve or reject;
vi. The actor may select an option of whether re-process a rate sheet or not and submit the audit;
vii. If the actor decides to re-process a rate sheet, the current rate sheet and rate sheets submitted after that will be re-processed;
viii. The audit report details may be captured in the system.

(13) Split window:
i. For auditing purposes, the costing system 200 may capture and store a rate sheet format upload history;
ii. The data for the split window display may be retrieved from various different database tables. The retrieved data may be selected based on a rowid & sid combination;
iii. The result may be displayed in single screen format with an html table structure;
iv. The audit-related details like remarks may be fetched from Audit tables;
v. Any differences may be highlighted with different colors.

(14) Audit report:
i. The following details may be stored in Audit related tables:
(1) A Pass condition may result if there are no issues in the audited rate sheet;
(2) A Fail condition if there are issues with the rate sheet. This condition is preferably communicated to the supervisor;
(3) "Approve"—Changes done and approved by supervisor
(4) "Reject"—No changes made & rejected by supervisor
(5) Remarks
(6) Pareto Category
(7) SID of the rate sheet
(8) The actor who selected the rate sheet for auditing
(9) Time stamp of selection
(10) Reason for selection
ii. The Pareto chart is captured based on these details

(15) Audit Rejects—Part of O/B communications
i. The costing system 200 may store rate sheets marked as 'defective' in an 'audit rejects' table of a database
ii. The details may be retrieved from auditing tables of the database based on the defective status.

Account Management

Account Management provides the functionalities for setting System Level and Supplier Level Parameters. The user/actor can manage roles, update admin users, manage white list and manage sister and family groups The following are the actors (i.e. participants in the data entry and/or data processing processes) for this module:

Supervisor: employees of a telecom company may belong to this user group. This user groups involves in editing the access rights to both System Level and Supplier Level Parameters, creating/editing the roles, admin users, white list users, sister and family groups.

Rate Admin: Rate Admins may use Account Management for creating/editing/deleting white list users.

Director: This user group is responsible in editing the access right both System Level and Supplier Level Parameters and involves creating/editing the roles and white list users.

Supplier Manager: Supplier Managers use Account Management system for updating admin users and creating/editing family groups.

Manage System Level Parameters

These are the parameters which are common across all users. During system start up these parameters may be loaded into the cache. And whenever this data is required it can be accessed from the cache. If these parameters are updated from the corresponding screens, the cache may be reloaded.

If effective rate related parameters are updated, then the system will trigger a process to recalculate the effective rate and adjusted effective rate for the all the current and scheduled rates in the system.

The Actor has access to edit the system level parameters:
(1) The System Level Parameters link may be enabled based on an actor's functional capability stored by the costing system 200.
(2) The System Level Parameters values are displayed with their current values.
(3) The Actor can update one or more parameter values and the costing system 200 can store these values in the appropriate database.

Manage Supplier Level Parameters

These parameters may be specific to the supplier and may be common for all the users associated with the supplier. If any parameter is not defined for a supplier system, the system may employ a default value from the system level parameters if these parameters are available.

If the time zone or currency for a supplier is updated, the system may trigger a process to invalidate all the rates in the system. The system may also send an email to the rate admin asking for the rates to be loaded again.

If effective rate related parameters are updated, then the system may trigger a process to recalculate the effective rate(s) and adjusted effective rate(s) for the one or more of the current and scheduled rates in the system for the supplier (or sister group).

An actor can have access to edit the supplier level parameters
(1) The Supplier Level Parameters link may be enabled based on the actor's functional capability stored by the costing system 200.
(2) Actor searches the suppliers by providing CMS Id or company name and list of suppliers will be displayed by the costing system 200.
3) By Clicking on any displayed supplier id, Supplier Parameters and Supplier Level parameter values are displayed by the costing system 200.
4) The Actor can edit one or more parameter values and the costing system 200 can store these values in the appropriate database Manage Roles The Actor can create a new role or update/delete an existing role.
(1) Manage Roles link will be enabled based on the actor's functional capability stored by the costing system 200.
(2) The costing system 200 permits the actor to enter a role name and lists out the functions for that role and the costing system 200 permits the actor to save the information.
(3) The actor can modify the existing role by adding or deleting some functionality.
(4) The actor can delete the existing role.

Following include some of the different types of roles:
(1) Rate admin
(2) Supervisor
(3) Supplier Manager
(4) Director
(5) VP
(6) Routing/market manager/buyer (Their role with respect to costing is same)
(7) Guest User (read-only)
(8) No access group
(9) Developer/Ops Update Admin User The Actors can update/disable the admin user data
(1) When a user (whose information is not present in costing system) tries to access this Administration link, the link may display a page with the text "Your current role is not authorized to access this page. To request for access to this page please log a call through the Access Request Page".
(2) If the user clicks the page link, the page link may display an Access Request Form. The Actor can identify which role (which may identify an authority and/or system access level) he needs, comments and submit the request.
(3) Once the actor submits the request, the request may go to an administrative group (or other suitable group or system) for approval. This administrative group can approve/reject, edit, and/or delete the request and provide comments.
(4) The costing system 200 may permit the administrative group to assign the user with a role and store the user's i.d. and access information in the costing system 200.
(5) Once the administrative group approves the access request, the request may be submitted to a Supervisor approval.
6) Once the supervisor approves a user, the costing system 200 may create a role and store this information in an appropriate database.
7) The Supervisor can add and/or delete a role for the user.

White List Management

The Actor can add an email id to the white list. Adding an email id to the white list may include one or more of the following steps.
(1) The Manage-white-list link may be enabled based on the actor's functional capability stored by the costing system 200.
(2) The Actor may search for the supplier based on a CMS ID for which the white list needs to be managed. The costing system 200 can display a retrieved list of CMS IDs.
(3) The costing system 200 selects a CMS ID from the list. The costing system 200 displays the emails/domains that are currently there in the white list for that CMS ID.
(4) The Actor may create one or more email ids or domain names for storage associated with the CMS ID.
(5) The Actor can update/delete one or more domain names or email ids which are not the primary contact for a particular CMS ID. The Actor preferably cannot delete the primary sender for a CMS Id.

(6) Actor can enable or disable the email ids for a CMS ID.

Sister Group Management

The Actor can create, edit, and/or delete the sister group.
(1) The costing system 200 may provide an actor with a link to manage a sister group based on the actor's functional capability.
(2) The costing system 200 may generate a list of sister groups and enable the actor to choose a sister group from the list. The system may display the list of sisters present for this sister group. The system may also display the big sister, family to which it belongs and whether it is a test sister or not.
(3) The costing system 200 may enable the actor to create a sister group for a CMS Id. The Actor may provide information for the sister group name, a test sister group, a family to which this group belongs, and/or a list of CMS's and big sister groups.
(4) The Actor can update a sister group for CMS Ids.

The Actor can delete the sister group for a CMS Id. Preferably, there is one Big Sister per Sister Group.

Family Group Management

Actors can create, edit, and/or delete the family group with a set of sister groups and individual CMS Ids.
(1) The costing system 200 may provide an actor with a link to manage a family group based on the actor's functional capability.
(2) The costing system 200 may generate a list of family groups and enable the Actor to choose a family group from the list. The system may display the list of sister groups present for this family group, and test family group and individual CMS ID's.
(3) The costing system 200 may enable the Actor to add and/or remove individual CMS Id and sister groups.
(4) The costing system 200 may enable the Actor to create a family group by providing family name, test family and individual CMS ID's.

O/B Communications

Outbound Communication may speed up the rate sheet submission process by correspondence communication. This process can view the contents/data in a mailbox associated with the costing system 200 and send the clarification request (or) correspondence for the rate sheet.

Rate Admin: Rate Admins are one of the main users of the Outbound Communication system. This user group is involved in rate sheet communication, sent by suppliers.

Supervisor: Supervisors may use Outbound Communication system to send rate sheet correspondence to the supplier.

Supplier Manager: Supplier Managers use the Outbound Communication system for providing approvals to rate admin team for processing rate sheets sent by suppliers.

View Mailbox (1) The costing system 200 may enable the Actor to view the emails which are categorized as listed in the following: rate sheet, correspondence, spam, outbox.
(2) The costing system 200 may enable the Actor to view the costing emails by applying a filter with date range and supplier.
(3) The costing system 200 may enable the Actor to open a rate sheet attachment, correspondence attachment and send correspondence attachments.

(4) The Supervisor can move spam email to rate sheet queue or correspondence queue.

a) When the supervisor moves email from spam to a rate sheet queue, then the spam email object can be fetched from a database table dedicated to spam emails and moved to one or more tables dedicated to storing rate sheet information. In the event that the attachment type is .doc/.zip/multiple excel files, the rate sheet processing mode may be changed to semi-automated.

b) When the supervisor moves email from a spam queue to a correspondence queue, then the spam email object may be fetched from a database table dedicated to spam emails and moved to one or more tables dedicated to storing correspondence information.

(5) In one embodiment, the Actor cannot delete the emails from any category specified above.

Send Outbound Communication (1) The Actor may send correspondence for clarification on a rate sheet by replying and/or forwarding a received message. The costing system 200 may store this correspondence and the correspondence may be assigned one of the following priority levels: a priority 1-correspondence, 2-automated, 3-bulk mail.
(2) Outbound email may include a submission id in the subject.
(3) The costing system 200 may enable a User to pick and edit canned messages while sending correspondence. The costing system 200 may enable the user to populate place holders in the canned message with stored supplier specific information.
(4) The costing system 200 may enable users to obtain data on white-list users. For example, the white-list users may be obtained from the address book of an email server.
(5) The costing system 200 may enable a user to select a delivery assurance option for outgoing emails.
(6) The costing system 200 may store read receipts information (lost, deleted without being read, undeliverable).
(7) Admin may put a supplier rate sheet on inquiry mode.
(8) Admin can resend the email by modifying the email id.
(9) All outbound emails are cc'ed to buyer for that supplier.
(10) Blacklisting supplier based on an email bounce count.
  a. The costing system 200 may send emails to a supplier's email ids on a white list associated with the supplier. The costing system 200 may determine and track the number of emails sent to the supplier's email ids that have been bounced (e.g., based on a message or other indicator that an email could not be delivered to the intended recipient).
  b. If this bounce count is greater than the system-level-parameter value for the bounce, then the user associated with the email id having a high bounce count may be deleted/blacklisted from a list of authorized users and or the white list.
  c. If there are no more suppliers' email ids in the white list, then the costing system 200 may send a Rate Admin Supervisor an alert of this information.
(11) The system may send an alert to the supervisor and supplier manager if the supplier has not replied to the alert in one business day (or other suitable time period).
  a. This communication process may be a background process which runs for about every five minutes (or other suitable time period).
  b. The system may determine whether any stored correspondence has received any response. If there is no response record, then the Rate Admin Supervisor and Supplier Manager are sent an alert regarding this information Bulk Correspondence 1) The costing system 200 may permit a user to send bulk emails to one or more suppliers/buyers. The costing system 200 may sore the bulk email information with a priority of 3.

2) The costing system 200 may permit user to retrieve a stored white-list of e-mail ids for the bulk emails.

Portal

In one embodiment, the features of the costing system 200 described herein are provided through a network based portal application. In one such embodiment, the portal application is accessible by all users through the Internet as well as through private networks. The Rate admin may use this application to create supplier super users.

The operations and functional scenarios of the portal module may include one or more of the following:

Manage User (Create/Update)
Manual Entry
Rate sheet upload
Help/University
Reports The Actors. Rate Admin: Rate Admins are one of the main users who create the supplier super users. Supplier Super User: Supplier super users may create normal users.

One or more of the following steps may be performed in connection with the operation of the portal system.

A) Create User
(1) The system may enable creation of a user (which may include creating a user profile);
(2) A user may log in to a portal. Authentication and authorization may be performed through conventional methods through the portal.
(3) The user may click on the create-user option
(4) The user may enter one or more of the following details and submit them: (a) Username; b) Email id; (c) Modules available for the user (list populated from portal); (d) Functions that the user has access to in each of the selected module (list populated from portal); and/or (e) Role—Super user or normal user (list populated from portal).
(5) If the user selects a "mail rate sheets" function, the whitelist may be updated appropriately in the costing database.
(6) The system may save the data in a portal authentication manager.
(7) The portal send an e-mail to the supplier user for successful user creation along with a newly created "userId".

B) Update User
(1) The Actor logs in to the portal and clicks update user.
(2) The portal may fetch the existing user details from authentication manager.
(3) The user can update the profile and change access rights and submits.
(4) If the user modifies "Mail rate sheets" function, the white list may be updated appropriately in the costing database.
(5) The portal may update the profile in the portal authentication manager.
(6) The portal may use the existing component to send e-mail to the supplier user for successful updating.

C) Manual Rate Entry
(1) The portal may ask the supplier to accept an agreement before proceeding with any other functionality (e.g., licensing terms, terms of use, an agreement that any submitted rates are binding, manual & upload rate entry, etc.). The acceptance data may be captured in the portal for further interactions.
(2) Depending upon the user and function assignments, the access to appropriate functions/links (like Manual Rates, Upload rates etc) may be enabled; i. These details may be retrieved from the portal authentication manager.
(3) The costing system 200 may determine a list of CMS IDs of logged in suppliers.
(4) The costing system 200 may prohibit the rate admin from manually entering a rate if there is already a rate sheet in the queue for that supplier (or any CMS from sister group) or any rate sheet in inquiry state or any assigned or unassigned rate sheet existing.
(5) If the supplier user belongs to multiple CMSIDs, the actor may select one.
(6) User updates the rates and submits.
(7) The costing system 200 may update the rate sheet entries based on the user submitted rate updates D) Upload Rate sheet
(1) The portal may ask the supplier to accept an agreement before proceeding with any other functionality (e.g., licensing terms, terms of use, an agreement that any submitted rates are binding, manual & upload rate entry, etc.). The acceptance data may be captured in the portal for further interactions.
(2) Depending upon the user and function assignments, the access to appropriate functions/links (like Manual Rates, Upload rates etc) may be enabled. (i) These details may be retrieved from authentication manager.
(3) The costing system 200 may determine a list of CMSIDs of a logged-in supplier user.
(4) The system may not allow a rate admin to manually enter a rate if there is already a rate sheet in the queue for that supplier (or any CMS from sister group or any rate sheet in inquiry state or any assigned or unassigned rate sheet existing).
(5) If the supplier user belongs to multiple CMSIDs, the actor may select one.
(6) The user may upload the Rate Sheet and submit it.
(7) The costing system 200 may update the rate sheet entries based on the user submitted rates.

E) Manual Rate Entry & Rate Sheet Upload

For manual rate entry/upload rate sheet, the rate sheet may be processed immediately without getting into the queue.
(1) The portal may not have separate steps for applying template, business rules and submissions. There is no split screen while Uploading a rate sheet.
(2) Once the actor accepts an agreement for both manual & upload rate entry separately, the actor will be not prompted again to accept an agreement.

Effective rateEffective Rates

An actor may override the default effective routing rate (eEffective rateEffective rate) for a given supplier DNIS. Effective rate overrides can be used for several business purposes including favoring suppliers, for bad debt, commitments, or other similar reasons.

Actors: Routing Manager, Marketing Manager

An Actor may have an option to manage (add/edit) the costs for the supplier destination.

a. The costing system 200 may enable an actor to select a Supplier Name and click on a Search button to search for the Supplier. The following current active rate details may be shown to the actor grouped by Destination and Costs for that Destination.

CMS ID
Destination Name
DNIS
Base Rate in COR
Effective rate in USD as hyperlink
Adjusted effective rate in USD b. When an Actor clicks on a provided effective rate link, a window/screen may be displayed where the actor can enter the following details:

Cost description
Cost. (There can be multiple cost components that can add up to the cost)
Start date and End Date Cost can be defined as a percentage of the base cost instead of providing an absolute value of the cost.

c. In this window, there may be an option to freeze the effective rate. If the effective rate is made as frozen rate, there may be an option to enter the frozen rate value.

d. If the effective rate is frozen, then the user will not be given option to define the costs. This way the costing system 200 can determine that either there is a Frozen effective rate or an adjustment to Base Rate (Costs).

e. The actor may update the values and click on the save button. The popup screen will be closed. The costs defined will be stored at supplier destination DNIS level.

f. A summarized email containing the cost and/or effective rate changes can be sent to buyers and the routing managers.

g. No separate DRF, DRA exception report is required in the system. A background process may be scheduled on a weekly basis (configurable) to consolidate the changes made to DRF & DRA factors at supplier level and mailed to Supplier Management group. The costs are stored at destination's DNIS level.

If the DNIS (A) is getting removed from Destination D1 and added to another destination D2 for which costs are already defined, the costs of that DNIS (A) will still be retained and shown to the actor at destination D2 grouped at costs of DNIS (A).

If the new DNIS (A) is getting added to a Destination D1 for which costs are already defined, the new DNIS may be shown to the actor at destination D1 but grouped under DNISs for which no costs are defined.

In one embodiment, the current active rates may be shown to the actor, the rates shown as a function of Supplier destination and/or costs.

(Bilateral) BILAT Rates:

If rates submitted by the supplier for a particular DNIS have a Bilat, effective rates and Adjusted effective rates may be calculated as usual. Bilat may be an agreement between two parties that is generally of equal value or equally beneficial to both parties. Most bilaterals have a contractual element, some do not. An agreement to send each other a given number of minutes in a time period (month).

LNP Rates:

The LNP Rates submitted by supplier can be mapped to the communication network of any telecom company.

The eEffective rate calculation process can run in the background to calculate/recalculate the effective rates and Adjusted effective rates and will be triggered on the below triggering points.

Triggering Points for Calculation:

(a) Rate Sheet submission: When new rates are submitted, effective rates and Adjusted effective rates can be calculated for those rates if they are current active rates.

(b) Costs update: Whenever the actor defines/edits costs for a particular supplier destination, effective rates and Adjusted effective rates may be recalculated for current active rates of that supplier destination only.

(c) Supplier Level Parameter: Whenever any supplier level parameter which is used for calculating effective rate and Adjusted effective rate is changed, then effective rates and Adjusted effective rates may be recalculated for current active rates of that supplier only.

The following are the supplier level parameters used in calculating effective rates and Adjusted effective rates:

(1) DRF—Debt Recovery Factor
(2) DRA—Debt Recovery Adder
(3) Use Billing Terms—Yes, then Billing increment factor will be used. No, then BIF will be 1
(4) PTF—Payment Terms Factor can be overridden with default value
(5) Date—Date until which PTF need to be overridden (d) System Level Parameter: Whenever any system level parameter which is used for calculating effective rates and Adjusted effective rates is changed, then effective rates and Adjusted effective rates may be recalculated for current active rates of all the suppliers.

The following are the supplier level parameters used in calculating effective rates and Adjusted effective rates:

(1) DRF—Debt Recovery Factor
(2) DRA—Debt Recovery Adder
(3) i_yearly—Yearly Interest Rate
(4) Use Billing Terms—If Yes, then Billing increment factor (BIF) will be used. If No, then BIF will be 1.
(5) PTF—Payment Terms Factor can be overridden with fixed value
(6) Date—Date until which PTF need to be overridden (e) Exchange Rate Feed: Whenever the exchange rate feed is getting processed, the effective rates and Adjusted effective rates may be recalculated for all the current active rates for all the suppliers.

(f) Billing Increment: Whenever the Billing increment feed is getting processed, the effective rates and Adjusted effective rates may be recalculated for current active rates of those suppliers for whom the Billing increment factor has changed.

(g) n value: Whenever the Billing cycle and days to pay feed is getting processed, the effective rates and Adjusted effective rates may be recalculated for current active rates of those suppliers for whom the billing cycle and days to pay is changed.

(h) Time zone change: Whenever the Time zone feed is getting processed, the effective rates and Adjusted effective rates may be recalculated for current active rates of those suppliers for whom the time zone has changed.

Effective Rates Calculation Process and High Level Data Structure

Effective Rate and Adjusted Effective Rate Calculation:

The following formulae may be used to calculate effective rate and Adjusted effective rate.

(1) effective rate Calculation $$\text{effective rate} = \text{Base rate} * \text{Conversion Rate} + \text{cost}$$

(1) Base Rate:—from the current tables which supplier had submitted.
(2) Conversion Rate:—Exchange Rate from Exchange Rate Table
(3) Cost:—the different cost components maintained at Destination level for that supplier. These costs can be defined in the edit effective rate.

(2) Adjusted effective rate Calculation $$\text{Adjusted effective rate} = \text{effective rate} * \text{Supplier Destination Factor(SDF)} * \text{Debt Recovery Factor (DRF)} + \text{Debt Recovery Adder(DRA)}$$

(1) effective rate:—effective rate calculated in above step.
(2) SDF=Billing Increment Factor (BIF)*Payment Terms Factor (PTF)

Billing Increment Factor will be obtained from billing system and it will be a mapping between Billing Increment and average call duration.

$$\text{Payment Terms Factor(PTF)} = 1/(1+i\_daily)^n \text{ where}$$

$i\_daily = (1+i\_yearly)^4 (1/365.25)-1$ ii_yearly is the system level parameter which can be obtained from a Business System table $n$=time to pay=billing cycle+days to pay PTF can be overridden with the system level parameter.

iii. Debt Recovery Factor (DRF)—Supplier Level Parameter. If not defined at supplier level then should be taken from System Level Parameter.

iv. Debt Recovery Adder (DRA)—Supplier Level Parameter. If not defined at supplier level then should be taken from System Level Parameter.

Module Interaction

Administration:

The Administrator module is preferably the first one to be available in the system.

Initially, when the application is deployed in the production environment, the seed data along with one administrator role and one profile (access to user management and role management functions) can be created in the system. The administrator login into the system and creates new roles in the system (most of the roles are pre-populated during the system setup in production environment), and user profiles created by assigning the roles based on their functional responsibilities.

The system level parameters can be populated with the default values during the system setup, and a later user with proper privileges can modify these parameters. This module would be the supporting module for all the functional modules.

The entire supplier management activities including activating the suppliers, Managing family & sister groups, and Managing the whitelist may be part of the Administration module. At least one active supplier may exist in the costing system with a valid email id, or a valid domain should exist for that supplier for receiving the rate sheets through emails (Inbound module).

Workflow Management:

The workflow management module may be the base module for the functional modules of the system. User Management, Rate Sheet submission, and/or Audit modules may depend on the listed modules.

From the stage of getting access to costing system 200 to rate sheet processing and auditing may require approval at various levels of authorization and security. Modules such as for rate sheet processing, auditing, user management, and/or queue management of the costing system may depend heavily on the work flow process for getting suitable authorization from supervisors. Seed data for the work flow may be populated with the list of processes which requires approval flow, approval levels, and/or escalation periods in the costing system during the initial system setup.

Outbound Communication:

The Rate sheet module may employ this module for Rate sheet correspondence.

The Outbound communication module may be used for sending communication to external/internal users of the costing system (suppliers/supervisors/rate admins, etc) through emails. Any message to be delivered using email may use outbound communication. Rate sheet correspondence, policy blasts, system alerts and email notifications may depend on the outbound communication. While processing the rates sheet, the system may send auto correspondence to suppliers. Rate admins may also conduct correspondence with suppliers using the outbound communication module.

Queue Management (Communication):

The Queue Management module may manage the queue ranks and rate sheets sent by suppliers. The output of queue management module may be input to the Rate sheet processing module.

Rate Sheet Processing:

Rate sheet processing may be a functional module of the Costing Application. Most of the downstream systems (Routing and Billing) may depend on the output of Rate Sheet Processing module. Rate sheet processing may generate the current rates based on the supplier rate sheet submission which are output to other systems. For example, supplier rates captured by the costing system 200 may be transmitted to a least cost routing system and used to help determine a path for terminating (connecting) a call that balances costs and quality of the call. Calculation of effective rates may also use the rates processed by this module, once the rates are saved to the system. The system in the background calculates and populates the effective rates.

External systems like billing systems may use the rate sheet information for closing the transactions for generating the invoices. Rate sheet processing may also depend on external inputs like 'pricing & routing destinations' for ignoring certain business rules during the validation process.

Effective rates:

The Effective rates module may calculate final rates for terminating the traffic at a certain destination based on the supplier rates and cost incurred for terminating the traffic. The rate may also depend on the billing increment factor provided by the billing system. The Effective rates module may also allow the Routing/Marketing manager to access from Routing system and configure the factors for calculating the effective rates.

High Level Data Structure

The data related to the User profile may be managed in the corporate director server which may be used as an Authentication mechanism. Except for the User profile Data, most or all the remaining data and the relationships can be stored in the database. In the database, separate schema can be used for storing active transactional data as well as historical data. The database setup is clustered to handle failover scenarios with a common storage device. The table spaces, synonyms, and data storage file sizes may be defined during the low-level design of the Physical data model.

The major data entities of the costing system application are:

(1) Inbox/Outbox Communication: The data related to Inbound and outbound communication module can persist in this model. The communications received from the suppliers and sent to suppliers including policy blasters and auto responders can be saved in this data model.

(2) Rate sheet processing: Various types of rate-sheet-submission-related data may be persisted in this model which includes flat, advanced, volume and LNP rates. Once the submission is triaged by the inbound process or the user uploads a new rate sheet, the submission and attachment details are stored in this model. The rate sheets processed by the costing application may be maintained in the different logical work areas which are 'pre-work', 'work', 'previous' and 'history'. Once the submission is successfully saved, the data can be moved to 'current' and 'scheduled' tables and which are the main tables of the costing system used by many downstream systems.

(3) Suppliers and Families & Sister groups: The supplier-related information including family & sister groups and whitelist (active email id's from which the costing system can received rate sheets) can be managed in this model.

(4) User and Role Management: This model maintains the information access management and user profiles. In the event that the profiles belong to a rate admin, a skill level matrix may be managed under the same model.
(5) Audit Management: Audit related information may be maintained in this table.
(6) System/Supplier parameter: System-related parameters including global & supplier related parameters can be managed under this model.
(7) Workflow Management: The work flow management maintains the information related to one or more of the various types of approval processes available in the system and approval work flow. The approval requests and approvals may be maintained under this model. The history of the data having been approved/rejected may be maintained on the corresponding audit tables of the main transaction tables. The system may also maintain the different automated events that can be executed in the background.

Deployment Architecture

The costing system 200 may deploy multilayered architecture with at least one failover mode option. The deployment architecture may be mainly divided into five layers which can include (a) firewall, (b) network load balancer, (c) web layer, (d) application service layer and the (e) db layer (multiple database layer one for the main costing application). The firewall is the initial layer where user requests can be validated and may allow requests from valid IP addresses.

The second layer can include a Network Load Balancer, where the HTTP requests from intranet users may be balanced using a Random/Load based algorithm. Based on the algorithm configured in the NLB, the requests may be forwarded to an HTTP server either based on the load response from the HTTP servers or randomly (requests are shared evenly between two servers).

There can be two HTTP servers, configured in redundant mode to support the failover. In the event that any HTTP server goes down, the other HTTP server can handle the entire processing workload. The HTTP servers can create the HTTP session which can be forwarded to Application Servers configured in a clustered mode.

If the session replication option is exercised, a large amount of data can be replicated to other nodes, which may in turn have a large impact on the performance. Thus, loading large objects in a cluster node may provide an advantage. And also a dynamic cache may be configured on application servers to cache the data which can be used by application domain objects to avoid unnecessary database hits, which improves the performance of the application. The dynamic cache system may be configured such that any update to a cached object on one node can be replicated to other nodes application servers and thereby synchronize the objects stored in memory.

In case of any failure in any of the nodes, the HTTP request can be taken over by another application server node. If there are any transactions are in progress, they can be carried over to another node, and new HTTP request will be forwarded to an active application server node.

In this embodiment, the final layer is the database layer. The database layer may include a plurality of database setups. At least one of the databases may be the costing database. The costing database may be configured in an active-active mode with a common storage device. A server cluster may be used to configure the databases in an active-active mode and in case of a database failure while processing the transaction, the database application may be automatically switched over to another active database. The server can run in an independent mode.

Deployment View

Figure 14:
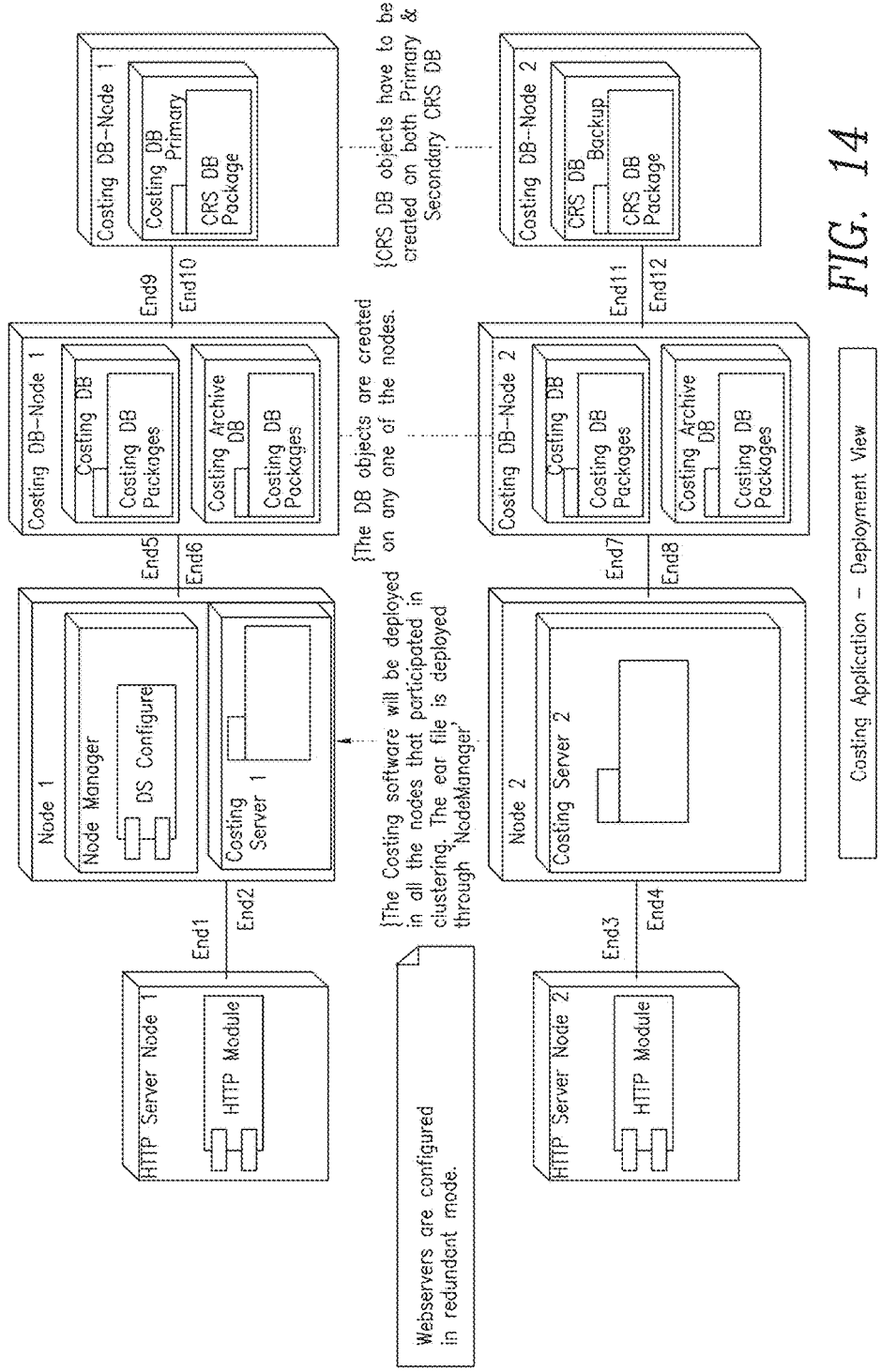
FIG. 14 is a block diagram of the operation of a costing application in accordance with an embodiment of the present invention.

FIG. 14 shows the costing application deployment view in the production site of a telecommunication system employing one or more aspects of the present invention.

Web Server Layer

An HTTP server may be configured on two (or other suitable number of) servers using any suitable operating system. The two servers may operate in a redundant mode. In order to forward the http requests to an application server, an application server HTTP module may be deployed and configured on both of the HTTP servers. These modules may be configured such that the HTTP server can forward requests to any of the application server nodes that participate in the cluster.

Business Layer

The application server may be configured in a cluster mode using session replication to support automatic failover. Both these application servers may run on any suitable operating system. On one of the application server nodes, a 'Node Manager' server instance, may be set up to maintain the various deployments and configurations of the nodes in the cluster. A data source may be configured on the 'Node Manager' to provide the connection pool to the costing application for accessing the database layer. A costing application enterprise archive may be deployed on all the nodes participating in the cluster through a 'Node Manager'.

The Node Manager may internally deploy the application on one or more of the nodes and help ensure that the packages are in sync within the cluster. Preferably, all changes to the application source should be made through an application server node manager. The cluster may take care of synchronizing the objects and cached information among the notes, including the failover. All the active sessions on one node may be replicated to another node to take forward to execute the request in the event of node failure.

Enterprise Information Layer:

The costing system may have two databases: one to maintain the costing related activities and another to generate the Current Rate Summary information. The costing database is a transactional database and may be configured in an active-active mode. On the other side, the CRS may also have two database instances, but these two databases may run in independent mode. If the primary database is not available, the downstream systems may use a secondary CRS database server.

Portal Application:

A few of the business functions of the costing application may be exposed to the portal application for allowing suppliers to manage the submissions on their own. Thus, a separate portal module may be built for the costing application and embedded into the portal application. This module may interact with the costing system for executing a few of the business operations (rate sheet management and white list management) through the web service interface.

| Acronyms | Definition |
| --- | --- |
| HLA | High Level Architecture |
| UBR | User Business Requirements |
| TOD | Time Of Day |
| DOW | Day Of Week |
| TOW | Time Of Week |
| CRS | Current Route Summary |
| J2EE | Java 2 Enterprise Edition |
| MS | Microsoft |
| effective rates | Effective Rates |

-continued

| Acronyms | Definition |
|---|---|
| Back to Back | Functionality which discard previously submitted Future Rates |
| DWH | Data Warehouse |
| DNIS | Dialed Number Identification Service |
| CMS | Contact Management System |
| XML | Extensible Markup Language |
| SSL | Secure Socket Layer |
| HTML | Hyper Text Markup Language |
| DB | Database |
| DAO | Data Access Objects |
| ORM | Object Relational Mapping |
| SAN | Storage Area Network |
| MDB | Message Driven Bean |
| ACG | Access Control Group |

Assigning Difficulty/Skill Level for Rate Sheet Processing:

In one embodiment, the costing system 200 may assign a difficulty/skill level with a rate rule/condition, depending on such factors as levels of skill. That is, the means of handling the email may be determined based on the difficulty posed by the email message. The handling means may be any of manual, semi-automatic, or fully automatic.

An example of a simple rate is: Rate=10 cents/minute for all time.

More complex cases may include rate variation such as the following: the rate varies with (a) time of day; (b) day of the week/month; (c) identification of the carrier; (d) location being called; etc. . . .

The difficulty level can aid the system in determining which person that the rate adjustment or new rate from new carrier gets assigned to.

Table I below correlates various score levels (left column) and task difficulty descriptions (center column) with skill levels of rate administrators. Table II below correlates various task categories (left column) with a point level that may correspond to a level of difficulty of the corresponding task.

TABLE I

| Score Level | Description | Rate Admin Levels |
|---|---|---|
| 0 to 18 | Very Easy | Level 1 |
| 20 to 38 | Easy | Level 2 |
| 40 to 58 | Medium | Level 3 |
| 60 to 78 | Hard | Level 4 |
| 80 to 98 | Very Hard | Level 5 |
| 100 and up | Extreme | Level 6 |

TABLE II

| Skill Criteria | |
|---|---|
| Category | Points |
| Bialt | 100 |
| Swap | 100 |
| Exemption List | 80 |
| Manual Entry | 70 |
| TOD, TOW, DOW - Single Destination | 70 |
| TOD, DOW, TOW - Multiple Destinations | 90 |
| Volume Commitments - Single Dest. | 40 |
| Volume Commitments - Multi Dest. | 60 |
| 1-100 Changes | 10 |
| 101-200 Changes | 40 |
| 201-300 Changes | 60 |
| 301-400 Changes | 90 |
| over 400 Changes | 100 |
| Multiple Worksheets | 20 |

Notes on Assigning Difficulty/Skill Level for Rate Sheet Processing:

Swap—an agreement between two carriers to exchange a certain number of minutes in a month or any other agreed upon period of time.

Bilat—5; Swap—5.

Account on Exemption list—4.

Advanced Pricing:

(TOD, DOW, TOW)—3 (more than 1 destination effected a 4)

(Volume Commitments)—2 (more than 1 destination effected a 3)

Number of Changes:

1-100=1

101-200=2

201-300=3

301-400=4 over 400=5

Regardless of the number of changes, if a rate sheet contains Bilat or Swap agreement, the Rate Admin Levels is automatically set to level 5. If it has changes and another field, calculate an average of both values to obtain a final score.

In one embodiment, adjustments can be made to the number of changes scale.

In one embodiment, the scale may be on a per rate sheet basis for audit, and may account for an overall average based on every processed rate sheet.

Figure 15:
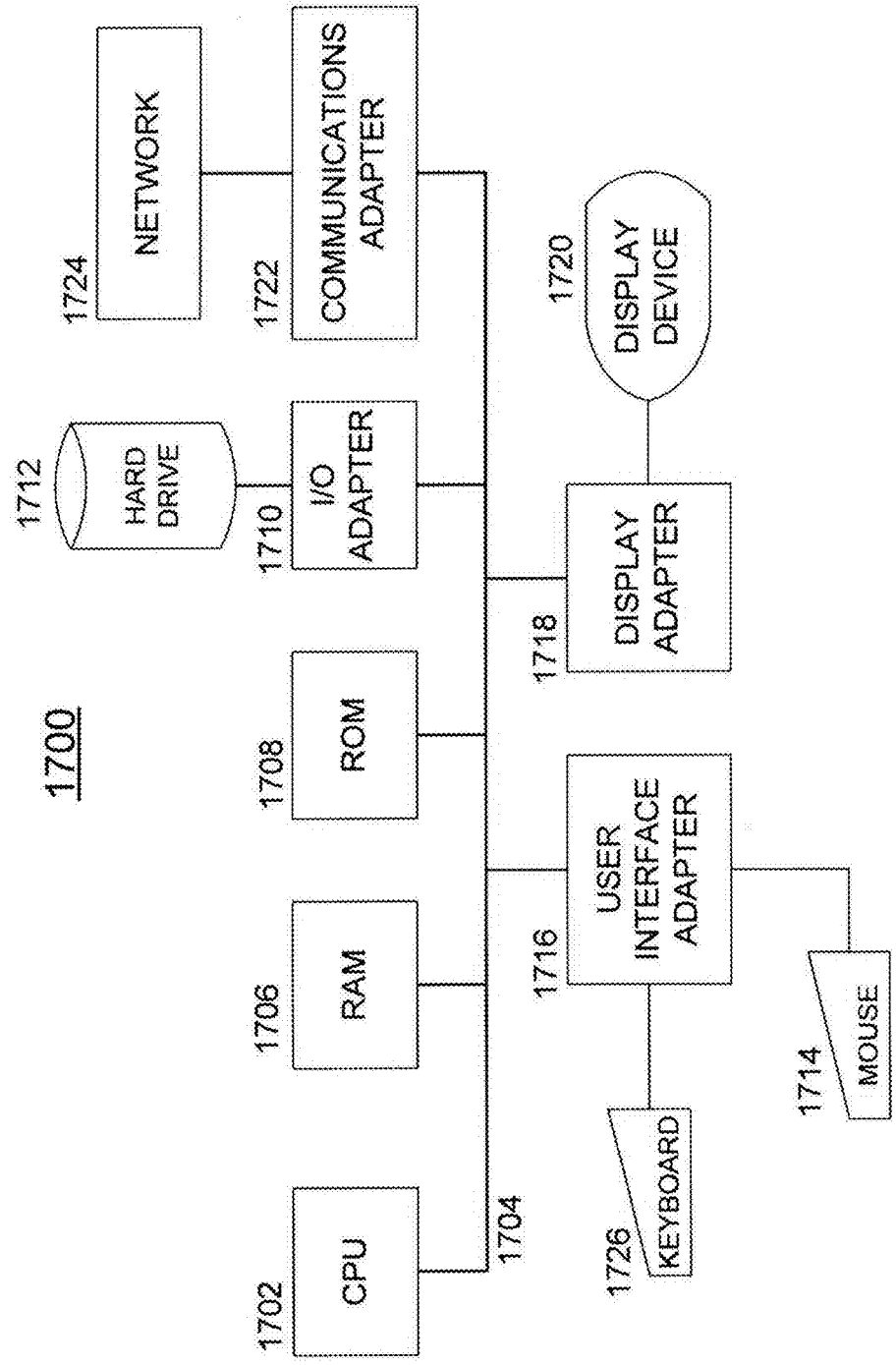
FIG. 15 is a block diagram of a computer system useable in connection with one or more embodiments of the present invention.

FIG. 15 is a block diagram of a computing system 1700 adaptable for use with one or more embodiments of the present invention. Central processing unit (CPU) 1702 may be coupled to bus 1704. In addition, bus 1704 may be coupled to random access memory (RAM) 1706, read only memory (ROM) 1708, input/output (I/O) adapter 1710, communications adapter 1722, user interface adapter 1706, and display adapter 1718.

In an embodiment, RAM 1706 and/or ROM 1708 may hold user data, system data, and/or programs. I/O adapter 1710 may connect storage devices, such as hard drive 1712, a CD-ROM (not shown), or other mass storage device to computing system 1700.

Communications adapter 1722 may couple computing system 1700 to a local, wide-area, or global network 1724. User interface adapter 1716 may couple user input devices, such as keyboard 1726, scanner 1728 and/or pointing device 1714, to computing system 1700. Moreover, display adapter 1718 may be driven by CPU 1702 to control the display on display device 1720. CPU 1702 may be any general purpose CPU.

Discussion of Various Embodiments

A) Reception and Processing of Email.

In one embodiment, a method may include the steps of receiving an email message; validating a sender i.d. (identification) based on an originating address of the email message, or the originating domain of the email message, or a combination of the two, or other feature. For example, the originating email address could be compared to a list of pre-approved senders, which list may be referred to as a Whitelist.

In one embodiment, a system may "auto-triage" the email message, which may include identifying the email message as belonging to one or more of various categories such as, but not limited to: (a) from a trusted sender, and the message includes rate info; (b) from a trusted sender, but not rate-related; (c) an unknown sender (content is may be irrelevant in this situation).

Queue Ordering

As shown in FIGS. 5a and 5b, queue ordering pertains to the order in which incoming email messages are accessed and handled by the system (possibly by people and/or a machine process), i.e. ordering need not be established solely by time of arrival as is commonly done.

Some factors to consider include: The importance/prominence of the carrier (or other sending entity). Some Carriers provide great rates but only call rarely.

The Notice period: The period over which a rate is contractually agreed upon to remain constant. The notice period may to be taken into account when queuing the message for opening/processing. Thus, the date on which the notice period included in the email expires can be used to order the message in the queue, instead of using only the arrival time. Thus, a message arriving on January 4 with a 2-day notice period (i.e. ending January 6) can be treated as having higher priority than, and being processed ahead of, a message arriving on January 2 with a 10-day notice period.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system comprising:
an email server for receiving an email from a telecommunications services supplier, the email including identification information of the telecommunications services supplier;
a costing system in data communication with the email server, the costing system comprising a multilayered architecture of at least five layers including (a) a firewall configured to validate requests from valid IP addresses, (b) a network load balancer configured to balance HTTP requests using a Random/Load based algorithm, (c) a web layer comprising an HTTP server on each of at least two redundant servers, (d) an application service layer comprising an application server HTTP module on each of the at least two redundant servers, and (e) a database layer comprising a costing database in data communication with a costing database server, the costing database configured to store data of at least one pre-approved telecommunications service supplier and telecommunications service rate information associated with the at least one pre-approved telecommunications service supplier, and
a current rate summary database in communication with the costing database, the current rate summary database configured to store updated telecommunication services rate information associated with pre-approved telecommunication services suppliers;
at least one costing interface in data communication with the costing database configured to one of view or replicate data in the costing database, the at least one costing interface including one or more of
a billing system interface,
a pricing and routing system interface,
a data warehouse system interface,
a contact management system interface, and
an order management system interface,
wherein the costing database server of the costing system:
determines whether the identification information of the telecommunications services supplier is one of the at least one pre-approved telecommunications services supplier stored in the costing database of the costing system;
determines whether the email includes a rate sheet containing telecommunications services rate information of the telecommunications services supplier;
classifies the email according to whether the telecommunications services supplier is one of the at least one pre-approved telecommunications services supplier and whether the email includes the rate sheet containing the telecommunications services rate information of the telecommunications services supplier;
if the email is classified as being received from the at least one pre-approved telecommunications services supplier and includes the rate sheet, transmits updates to the telecommunications services rate information of the at least one pre-approved telecommunication services supplier stored in the costing database according to the telecommunications services rate information contained in the rate sheet, thereby causing the costing database to be updated based in part upon the classification of the email;
outputs the updated current rates stored in the current rate summary database to the at least one costing interface, the at least one costing interface configured to one of view or replicate the updated current rates from the current rate summary database; and
queues the rate sheet based upon a Soonest Estimated Effective Date (SEED) of the rate sheet, the SEED based on a receive date of the rate sheet and a contractual notice period over which a rate in the rate sheet is contractually agreed upon to remain constant.

2. The system of claim 1, wherein the costing database server outputs the updated telecommunications services rate to the at least one costing interface.

3. The system of claim 1, wherein the current rate summary database is further configured to store current rates associated with all telecommunication service suppliers and destinations for a given time period.

4. The system of claim 3, wherein the costing database server updates the current rates stored in the current rate summary database with the updated telecommunications services rate stored in the costing database.

5. A system comprising:
an email server for receiving an email from a telecommunications services supplier, the email including identification information of the telecommunications services supplier; and
a costing system in data communication with the email server, the costing system comprising a multilayered architecture of at least five layers including (a) a firewall configured to validate requests from valid IP addresses, (b) a network load balancer configured to balance HTTP requests using a Random/Load based algorithm, (c) a web layer comprising an HTTP server on each of at least two redundant servers, (d) an application service layer comprising an application server HTTP module on each of the at least two redundant servers, and (e) a database layer comprising
   a costing database in data communication with a costing database server, the costing database configured to store data of at least one pre-approved telecommunications service supplier and telecommunications service rate information associated with the at least one pre-approved telecommunications service supplier, and
   a current rate summary database in communication with the costing database, the current rate summary database configured to store updated telecommunication services rate information associated with pre-approved telecommunication services suppliers;
at least one costing interface in data communication with the costing database configured to one of view or replicate data in the costing database,
wherein the costing database server of the costing system:
determines whether the identification information of the telecommunications services supplier is one of the at least one pre-approved telecommunications services supplier stored in the costing database of the costing system;
determines whether the email includes a rate sheet containing telecommunications services rate information of the telecommunications services supplier;
classifies the email according to whether the telecommunications services supplier is one of the at least one pre-approved telecommunications services supplier and whether the email includes the rate sheet containing the telecommunications services rate information of the telecommunications services supplier;
if the email is classified as being received from the at least one pre-approved telecommunications services supplier and includes the rate sheet, transmits updates to the telecommunications services rate information of the supplier stored in the costing database according to the telecommunications services rate information contained in the rate sheet, thereby causing the costing database to be updated based in part upon the automatic classification of emails;
queues the rate sheet if the email is classified as being received from the at least one pre-approved telecommunications services supplier and includes the rate sheet; and
overrides the queue based upon a Soonest Estimated Effective Date (SEED) of the rate sheet, the SEED based on a receive date of the rate sheet and a contractual notice period over which a rate in the rate sheet is contractually agreed upon to remain constant.

6. The system of claim 5, wherein the costing database server places the rate sheet in the order it was received.

7. A system comprising:
an email server for receiving an email from a telecommunications services supplier, the email including identification information of the telecommunications services supplier; and
a costing system in data communication with the email server, the costing system comprising a multilayered architecture of at least five layers including (a) a firewall configured to validate requests from valid IP addresses, (b) a network load balancer configured to balance HTTP requests using a Random/Load based algorithm, (c) a web layer comprising an HTTP server on each of at least two redundant servers, (d) an application service layer comprising an application server HTTP module on each of the at least two redundant servers, and (e) a database layer comprising
   a costing database in data communication with a costing database server, the costing database configured to store data of at least one pre-approved telecommunications service supplier and telecommunications service rate information associated with the at least one pre-approved telecommunications service supplier, and
   a current rate summary database in communication with the costing database, the current rate summary database configured to store updated telecommunication services rate information associated with pre-approved telecommunication services suppliers; and
at least one costing interface in data communication with the costing database configured to one of view or replicate data in the costing database,
wherein the costing database server of the costing system:
determines whether the identification information of the telecommunications services supplier is one of the at least one pre-approved telecommunications services supplier stored in the costing database of the costing system;
determines whether the email includes a rate sheet containing telecommunications services rate information of the telecommunications services supplier;
classifies the email according to whether the telecommunications services supplier is one of the at least one pre-approved telecommunications services supplier and whether the email includes the rate sheet containing the telecommunications services rate information of the telecommunications services supplier;
if the email is classified as being received from the at least one pre-approved telecommunications services supplier and includes the rate sheet, transmits updates to the telecommunications services rate information of the supplier stored in the costing database according to the telecommunications services rate information contained in the rate sheet, thereby causing the costing database to be updated based in part upon the automatic classification of emails; and
periodically reordering a queue, the periodic reordering comprising checking, at prescribed periods, Soonest Estimated Effective Dates (SEEDs) associated with each entry in the queue, and reordering the queue in ascending order of SEED, the SEED based on a receive date of the rate sheet and a contractual notice period over which a rate in the rate sheet is contractually agreed upon to remain constant.

8. The system of claim 7, wherein the costing database server updates the queue upon receipt of a new email with a rate sheet from one of the at least one pre-approved telecommunications services suppliers having a SEED value earlier than another rate sheet earlier in the queue.

9. The system of claim 8, wherein the update of the queue is based upon results of a prior update.

\* \* \* \* \*